United States Patent [19]
Rogers et al.

[11] Patent Number: 5,546,811
[45] Date of Patent: Aug. 20, 1996

[54] OPTICAL MEASUREMENTS OF STRESS IN THIN FILM MATERIALS

[75] Inventors: John A. Rogers, Castle Rock, Colo.; Keith A. Nelson, Newton, Mass.

[73] Assignee: Massachusetts Instittue of Technology, Cambridge, Mass.

[21] Appl. No.: 377,308

[22] Filed: Jan. 24, 1995

[51] Int. Cl.$^6$ .................... G01M 9/00; G01L 1/24
[52] U.S. Cl. .................................. 73/800; 73/762
[58] Field of Search ............. 73/800, 762; 356/32, 356/35, 35.5

[56] References Cited

U.S. PATENT DOCUMENTS

| | | | |
|---|---|---|---|
| 3,462,223 | 8/1969 | Tiemann et al. | 73/800 |
| 4,812,036 | 3/1989 | Inoue | 356/32 |
| 4,939,368 | 7/1990 | Brown | 73/800 |
| 5,361,638 | 11/1994 | Pettersson et al. | 73/800 |
| 5,438,879 | 8/1995 | Reda | 73/800 |

OTHER PUBLICATIONS

Allen et al., "Microfabricated Structures for the in situ Measurement of Residual Stress, Young's Modulus, and Ultimate Strain of Thin Films", Appl. Phys. Lett. 51:241–243, 1987.

Bauer et al., "Determination of the Stresses and Properties of Polymer Coatings", J. of Coatings Technology 60:51–55, 1988.

Burzynski et al., "Study of Anisotropy of Acoustic Wave Propagation in Stretched Poly(vinylidene difluoride) Film Using the Picosecond Transient Grating Technique", Polymer 30:1247–1250, 1989.

Coburn et al., "Stress in Polyimide Coatings", J. of Polymer Science: Part B: Polymer Physics 32:1271–1283, 1994.

Duggal et al., "Resolution of Conflicting Descriptions of Propylene Glycol Relaxation Dynamics Through Implusive Stimulated Scattering Experiments", Polymer Communications 32:356–360, 1991.

Duggal et al., "Real–Time Optical Characterization of Surface Acoustic Modes of Polymide Thin–Film Coatings", J. Appl. Phys. 72:2823–2839, 1992.

Duggal et al., "Real–Time Characterization of Acoustic Modes of Polymide Thin–Film Coatings Using Impulsive Stimulated Thermal Scattering", Appl. Phys. Lett. 60:692–694, 1992.

Fishman et al., "Surface Selectivity in Holographic Transient Grating–Diffraction", Stanford University, Stanford, CA; W. W. Hansen Exp. Phys. Lab. & Dept. of Chemistry.

Goldsmith et al., "Measurement of Stresses Generated in Cured Polyimide Films", J. Vac. Sci. Technol. 1:407–409, 1983.

Head et al., "Determination of Shear Stress at a Solder Paste/Stencil Interface", Mat. Res. Soc. Symp. Proc. 323:425–433, 1994.

Maden et al., "Stress Analysis of Thin Polyimide Films Using Holographic Interferometry", Experimental Mechanics 31:178–184, 1991.

(List continued on next page.)

*Primary Examiner*—Richard Chilcot
*Assistant Examiner*—Max Noori
*Attorney, Agent, or Firm*—Fish & Richardson, P.C.

[57] ABSTRACT

A method for determining the residual stress in an unsupported region of a thin film. The method includes the steps of (a) optically exciting the film with a spatially and temporally varying optical excitation field to launch counterpropagating acoustic modes along at least one wavevector; (b) diffracting a portion of an optical probe field off the excited acoustic modes to generate a time-dependent signal field at the excitation wavevector; (c) detecting the signal field to generate a time-dependent, light-induced signal; (d) analyzing the light-induced signal to determine the frequencies of the acoustic modes; (e) partially determining the dispersion of at least one mode; and, (f) comparing the measured dispersion to that calculated using a mathematical model to allow the residual stress properties of the unsupported region of the film to be determined.

22 Claims, 15 Drawing Sheets

OTHER PUBLICATIONS

Meth et al., "Generation and Detection of Acoustic Waveguide Modes in Ultrathin Crystals Using the Transient Grating Technique", Chemical Physical Letters 162:306–312, 1989.

Meth et al., "Experimental and Theoretical Analysis of Transient Grating Generation and Detection of Acoustic Waveguide Modes in Ultrathin Solids", J. Appl. Phys. 67:3362–3377, 1990.

Prasad, "Non–Liner Optical Effects in Thin Organic Polymeric Films", Thin Solid Films 152:275–294, 1987.

Rao et al., "Thin Order Nonlinear Optical Interactions in Thin Films of Poly-p-Phenylenebenzobisthiazole Polymer Investigated by Picosecond and Subpiosecond . . . ", Appl. Phys. Lett. 48:1187–1189, 1986.

Rao et al., "Picosecond Transient Grating Studies of Polymeric Thin Films", Appl. Phys. Lett. 48:387–389, 1986.

Rao et al., "Picosecond Laser–Induced Transient Grating Probe of the Mechanical Properties of High–Modulus Poly(p–phenylenebenzobisoxazole–2,6–diyl)", Macromolecules 22:985–989, 1989.

Rogers et al., "Study of Lamb Acoustic Waveguide Modes in Unsupported Polyimide Thin Films Using Real–Time Impulsive Stimulated Thermal Scattering", J. Appl. Phys. 75:1534–1556, 1994.

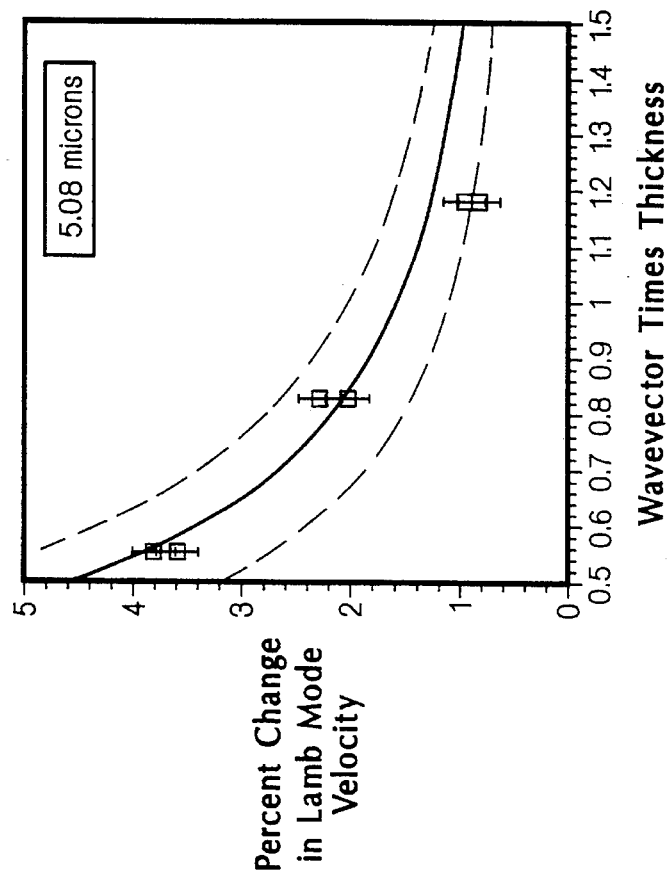
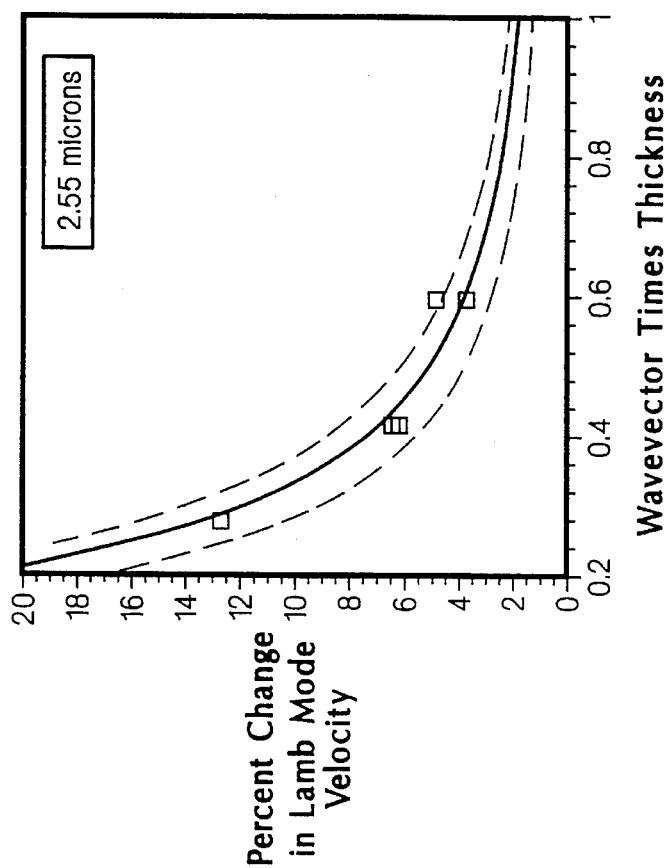
FIG. 12B
FIG. 12A

OPTICAL MEASUREMENTS OF STRESS IN THIN FILM MATERIALS

This amendment was made with government support under Grant Number 9317198-DMR awarded by the National Science Foundation. The government has certain rights in this invention.

BACKGROUND

Knowledge of the mechanical properties of thin films composed of, e.g., polymer, ceramics, diamond, or metals, is important in order to understand the performance of these materials. In many cases, devices incorporating films may be unable to function properly if the film undergoes mechanical failure. For instance, polymer films spin-cast onto semiconductor substrates perform both a protective and dielectric function; large residual stresses in these films can build up during and after the cure, causing the film to delaminate and rendering the semiconductor device inactive. In particular, in this case, build up of stress occurs because during spin casting, the film is heated to initiate the imidization (i.e., curing) reaction. During this process, water and solvent leave the spin-cast polyamic acid, resulting in contraction and generation of stress in the partially imidized film. Depending on the curing conditions and the type of polyimide film, the film may be further heated above its glass-transition temperature to initiate flow across the substrate's surface. As the now fully imidized polymer cools to room temperature, a mismatch in the coefficients of thermal expansion (CTE) between the film and the substrate generates new—and typically very large—stresses along the plane of the polymer.

SUMMARY

The invention provides a rapid, non-invasive, and accurate measurement of stress-related properties (e.g., the residual stress) in unsupported thin film samples.

In one aspect, the invention features an apparatus and method for carrying out the steps of: (a) optically exciting an unsupported region of the sample with a spatially and temporally varying optical excitation field having at least one excitation wavevector to launch counter-propagating acoustic modes along at least one excitation wavevector in the region; (b) diffracting a portion of an optical probe field off the excited acoustic modes to generate a time-dependent signal field at the excitation wavevector; (c) detecting the signal field to generate a time-dependent, light-induced signal; (d) analyzing the light-induced signal to determine the frequency or phase velocity of at least one acoustic mode corresponding to at least one excitation wavevector; (e) partially determining the dispersion of at least one mode; and, (f) comparing the determined dispersion to that calculated from a mathematical model generated using equations of motions for a stressed unsupported film system. This allows the residual stress properties of the film in the excited region to be determined.

In preferred embodiments, the probe field has a small spatial dimension compared to the excitation field, and the equations of motion for the stressed unsupported film system are substantially equivalent to $$\frac{\partial}{\partial x_i}\left(\sigma_{ik}^{(r)}\frac{\partial u_j}{\partial x_k}\right) + \frac{\partial \sigma_{ij}}{\partial x_i} = \rho\frac{\partial^2 u_j}{\partial t^2}$$

where $\sigma_{ik}^{(r)}$ is the residual stress tensor, $\rho$ is the density, $\mu$ is the displacement, and the coordinate system is defined with the wavevector along the z direction. In this case, the excitation field is preferably cylindrically focused to form an elliptical spot having a major axis along the z direction.

In preferred embodiments, the method further includes the step of exciting the film in the thick film regime (described below), or in either the thick or thin film regime (described below) along higher-order modes, to exclusively determine the film's mechanical properties. Following this determination, the film may be excited in the thin film regime using an optical excitation field which is strongly absorbed by the film to excite the lowest-order mode, thereby allowing its dispersion to be determined. Preferably, during step (f), the determined mechanical properties of the unsupported region of the film are then held fixed, and the dispersion from the thin film regime is compared to the mathematical model by varying only the residual stress value. This allows exclusive determination of the film's residual stress.

The spatially and temporally varying optical excitation field may contain a single excitation wavevector. For this type of excitation, prior to step (e), the method further includes repeating steps (a)–(d) to generate at least two frequencies or phase velocities corresponding to at least two separate excitation wavevectors. Alternatively, the excitation field includes multiple excitation wavevectors to excite acoustic modes at multiple wavevectors. In this case, the optical probe field is diffracted off each of the excited acoustic modes to generate multiple time-dependent signal fields at the excitation wavevectors. Each time-dependent signal field is then detected to generate multiple time-dependent, light-induced signals which are analyzed to determine the frequencies or phase velocities of the acoustic modes corresponding to the excitation wavevectors. In embodiments, this allows one to partially determine at least one mode's dispersion following excitation with a single excitation field.

In other preferred embodiments, prior to step (a), two substantially parallel cuts are made in the film to generate an increased anisotropy in the residual stress. The cuts are preferably separated by a distance of between 3 and 100 times the reciprocal of at least one of the excitation wavevectors, and each cut preferably has a length of between 1 and 5 times the distance separating the cuts.

In other embodiments, the comparing step of the method further includes the steps of: (g) proposing a series of values for elements of a stiffness tensor and the residual stress; (h) calculating frequencies or phase velocities based on the proposed stiffness tensor elements and the residual stress; (i) comparing the calculated frequencies or phase velocities to the measured frequencies or phase velocities; (j) repeating steps (g), (h), and (i) and updating the values for elements of the stiffness tensor and the residual stress until the calculated frequencies or phase velocities substantially match the measured frequencies or phase velocities to a desired degree; and (k) determining the residual stress properties from the match between the measured and calculated frequencies or phase velocities. In this case, the comparing process is stopped when the degree of matching is optimized according to a predetermined level.

In another aspect, the invention provides another apparatus and method for measuring the residual stress in a region of an unsupported first thin film. The measurement is carried out using the steps of: (a) optically exciting the region with a spatially and temporally varying optical excitation field having at least one excitation wavevector, thereby exciting a portion of the region along at least one wavevector; (b) diffracting a portion of an optical probe field off the excited portion of the film to generate a time-dependent signal field at the excitation wavevector; (c) detecting the signal field to generate a time-dependent, light-induced signal; (d) analyzing the light-induced signal to determine its time or frequency-dependent properties; and, (e) comparing the time or frequency-dependent properties of the light induced signal to the time or frequency-dependent properties of a second unsupported thin film having known residual stress properties. This comparing step allows the residual stress properties of the first unsupported thin film in the excited region to be determined.

In yet another aspect, the invention provides an apparatus and method for measurement of the residual stress in a region of an unsupported thin film sample. The measurement is carried out using the steps of: (a) optically exciting an unsupported region of the sample in the very thin film regime (defined below) with a strongly absorbed spatially and temporally varying optical excitation field having at least one excitation wavevector, thereby launching a lowest-order acoustic mode along at least one excitation wavevector in the unsupported region; (b) diffracting a portion of an optical probe field off the excited lowest-order acoustic mode to generate a time-dependent signal field at the excitation wavevector; (c) detecting the signal field to generate a time-dependent, light-induced signal; (d) analyzing the light-induced signal to determine the phase velocity of the lowest-order acoustic mode corresponding to at the excitation wavevector; and, (e) comparing the determined phase velocity to that calculated from a mathematical model generated using equations of motions for a stressed unsupported film system in the very thin film regime. This allows the residual stress properties of the film in the excited region to be determined.

In yet another aspect, the invention provides a method and apparatus for measuring the effect of residual stress in an unsupported film. The measurement is carried out by first preparing the film without substantially effecting the film's residual stress such that a region of the film is unsupported. The film is then optically exciting in the unsupported region to induce a Lamb mode, which is then detected. The dispersion or velocity of the detected Lamb mode is then compared to the dispersion or velocity determined from a mode of a model system, thereby allowing measurement of the residual stress in the unsupported film.

Embodiments of the inventions have the following advantages. In order to measure the residual stress in a film, optical excitation is used to induce waveguide or "Lamb" modes, which are coherent acoustic phonons involving longitudinal and shear motions having wavelengths on the order of the film thickness. These modes propagate along the film surface, and can be rapidly and non-invasively detected using optical methods. The data typically have high signal-to-noise ratios, and can be rapidly analyzed to determine residual stresses in the film. In addition, because the excitation and probing fields may be spatially limited to a spot with a diameter of a few hundred microns, the invention has the ability to measure properties with high spatial resolution.

The residual stress of the film can be used as a criteria for determining whether a film-substrate adhesion is adequate or whether the fracture/toughness limit of the film is being approached. Alternatively, the determined residual stress may be used as a diagnostic tool to gauge the CTEs of a film material. This information can be used, for example, to develop materials having more desirable mechanical properties. In addition, because the measurement can be performed rapidly and non-invasively, it allows stress properties of the film to be determined during the actual curing process. When implemented in this fashion, the method may be used in combination with a process controller to make real-time modifications to fabrication processes, thereby allowing production of higher-quality films.

All types of thin film materials, including polymer, metal, semiconductor, and ceramic films, can be analyzed.

Other features, aspects, and advantages follow.

DETAILED DESCRIPTION

Figure 1A:
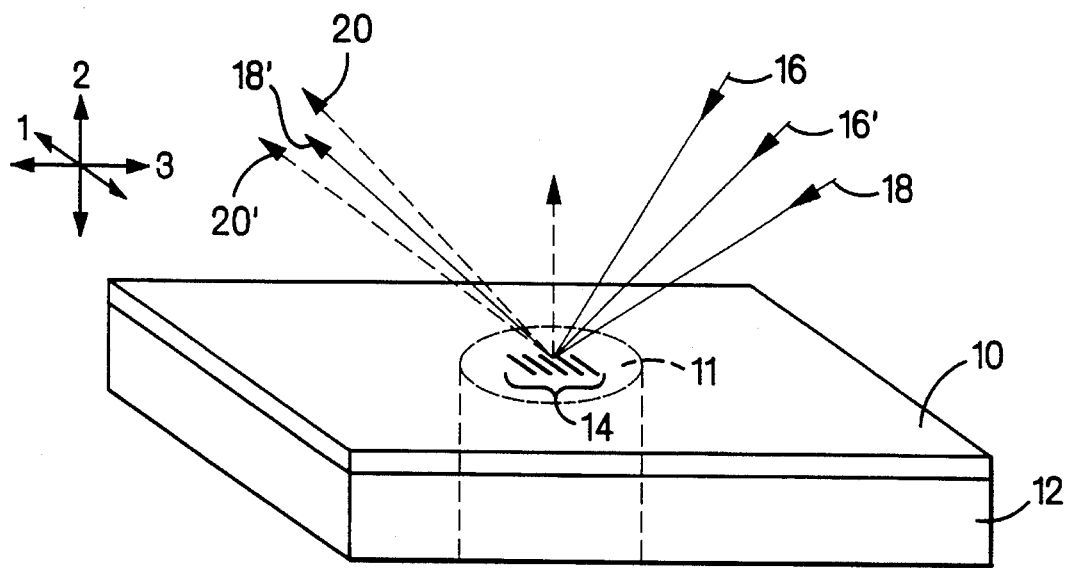
FIGS. 1A and 1B are, respectively, a schematic drawing showing the excitation, probe, and signal fields used according to the method of the invention, and a block diagram showing the steps used to process the signal field.
Figure 1B:
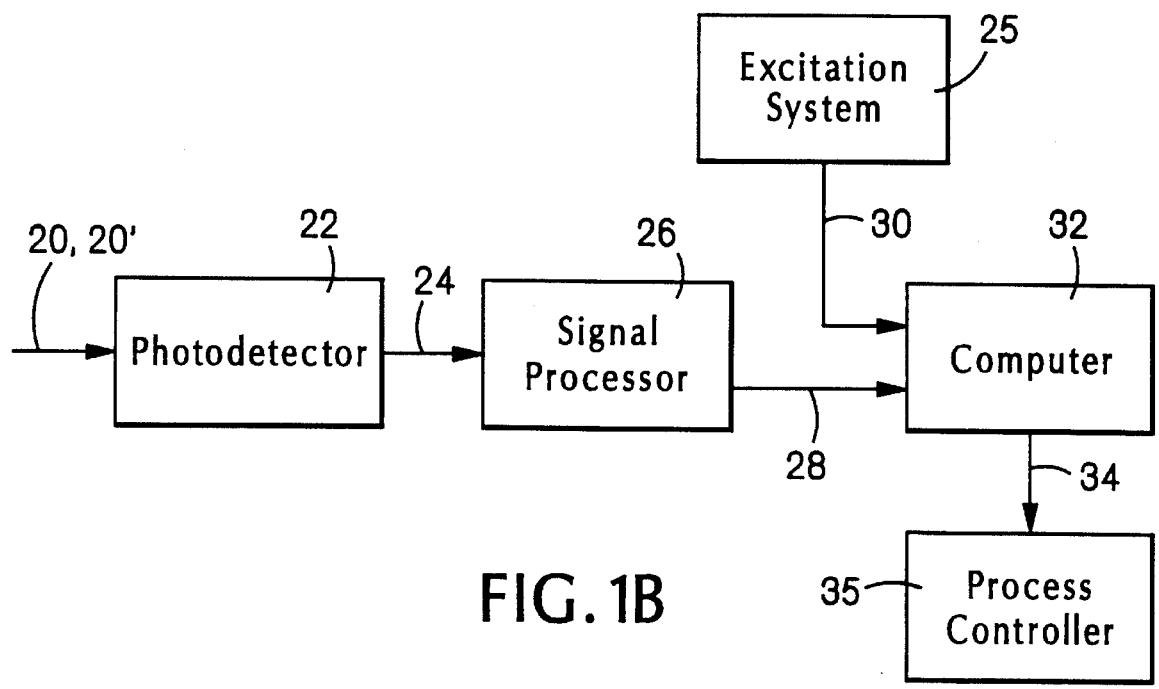

Referring first to FIGS. 1A and 1B, in order to measure the residual stress of a thin film 10 bound to a substrate 12, a portion of the substrate is first removed to leave a region 11 of the film unsupported, and a spatially and temporally varying optical excitation field 14 is generated in or on the surface of the region 11 using at least two excitation beams 16, 16'. Optical interference between the excitation beams results in an excitation field 14, which is expanded in the figure for clarity. Typically, this field is composed of periodic, sinusoidal "light" (i.e., constructive interference) and "dark" (destructive interference) regions having at least one well-defined excitation wavevector.

The excitation field 14 is used to induce Lamb modes in the film, which, in turn, can be measured and analyzed to determine the residual stress. Excitation can occur through several different mechanisms. For example, the sample may be excited using Impulsive Stimulated Thermal Scattering ("ISTS"); in this method, the optical energy of the light regions of the field is absorbed by the film, resulting in the deposition of heat followed by thermal expansion. This results in the launching of coherent, counter-propagating ultrasonic phonons having a wavevector matching the geometry of the excitation field. In Impulsive Stimulated Brillion Scattering ("ISBS"), another technique used to excite transient gratings in films, the sample is also excited using a spatially varying optical field, but the field's wavelength is not substantially absorbed by the film. In this case, optical energy is coupled directly into the film's acoustic field to excite the Lamb modes. The excitation process takes advantage of the inherent spectral line width in short-duration excitation pulses; higher-frequency photons from each excitation pulse are annihilated to create lower-frequency photons in the opposite excitation pulse. Lamb modes of the difference frequency and wavevector are then generated in the medium, resulting in the production of counter-propagating phonons along the in-plane dimension of the film.

Once excited, the temporal characteristics of the Lamb modes are sampled using a probe beam 18 oriented to irradiate the induced grating. Interaction with the grating results in at least two diffracted, or signal beams 20, 20', one of which can be detected using a photodetector 22 to generate a light-induced signal 24. The light-induced signal 24 is first analyzed with a signal processor 26 (e.g., a digital oscilloscope) to produce a digitized waveform signal 28 indicative of the temporal characteristics of the sampled mode. The signal 28 is then sent to a computer 32 for analysis along with a second signal 30 indicating the wavevector(s) of the Lamb mode(s). The wavevector signal 30, for example, may be generated by means associated with the excitation system 25. Analysis of the wavevector 30 and waveform 28 signals allows determination of the phase velocities of the waveguide modes; these properties, in turn, can be used (as described in detail below) to evaluate the stress-related properties of the film. Once the residual stress is determined, a status signal 34 specific for a particular film may be generated. This signal can be sent to a process controller 35 which can be used, for example, to reject a film having undesirable stress-related properties, or to modify a film-fabrication process in order to produce more desirable films.

Optical systems for generating and directing the excitation and probe beams have been described previously in J. A. Rogers et al., J. Appl. Phys. 75:1 (1994), A. R. Duggal et al., Ser. No. 07/910,762, J. A. Rogers et al., *"Measuring Anisotropic Properties in Thin Films"* Ser. No. 08/318,012, filed Oct. 4, 1994, and in the U.S. Patent Application of Rogers et al. entitled *"Simplified Device and Method for Time-resolved Optical Measurements"* filed on Jan. 24, 1995, the contents of all of which are incorporated herein by reference.

The optical systems are constructed so that measurement of the residual stress can be made rapidly and with high accuracy. For instance, the excitation system is arranged to maximize the number of waveguide modes that are excited in the film by each laser pulse, and to ensure that the lowest-order mode is excited. This allows accurate determination of stress-related properties in a relatively short period of time. The excitation pulses have a short time duration relative to the waveguide Lamb mode oscillation period, and typically have durations on the order of picoseconds to nanoseconds. In addition, the excitation pulses preferably have a wavelength at which 50% of the light is absorbed by the film. Preferably, the absorption is large such that all the light is absorbed in the first 10–20 nm of the film; this allows effective excitation of the lowest-order mode. Too little absorption may result in insufficient excitation of the Lamb modes. The wavevector of the excitation field is such that the wavevector/thickness product is preferably in the range of 0.1–10.0.

Lamb modes are preferably detected using a probe beam having a temporal width that is comparable to or longer than the Lamb modes' time duration. Preferably, the probe beam has a wavelength which is not absorbed by the film. Once detected, the light-induced waveform signal typically has a signal-to-noise ratio greater than, for example, 100:1. The signal-to-noise ratio can be further enhanced by signal averaging at a rate which is limited only by the repetition rate of the laser (typically around 1 kHz) or the speed of the recording electronics (typically on the order of a millisecond). By signal averaging, the signal-to-noise ratio can be improved to greater than 500:1 while still keeping data-collection times in the range of about 1 second.

The probe beam is preferably focussed to a spot size that is smaller than the excitation spot size. In particular, the excitation beams are preferably cylindrically focused to produce an elliptical spot on the film so that the major axis of the ellipse is along the direction of the wavevector and is much larger than the fringe spacing of the grating. This arrangement permits computation of stress-related properties to be simplified without substantially reducing accuracy. Ultimately, this results in a faster, more reliable analysis.

Following optical measurement, the stress-related properties are determined by an iterative fitting procedure in which the Lamb modes' phase velocities (or frequencies), as measured by the above optical system, are compared to calculated phase velocities (or frequencies). The calculated phase velocities are determined by solving the equations of motions for a stressed film system. For unsupported films in the thin film regime, these motions are essentially those of a two-dimensional membrane whose response frequency is a very sensitive function of the residual stress magnitude. This situation is similar to that of a taught string in which the velocities of modes excited by applying a force to the string are a function of the string's tension. At high tension, the string is in a stressed state, and the acoustic motions propagate at a high velocity. Alternatively, at low tension, motions propagate at a much lower velocities.

Preferably, the residual stress is determined in film samples which are partially unsupported, meaning that they contain regions which are not bound to a substrate. In unsupported films, the characteristics of the lowest-order Lamb mode are particularly susceptible to stress-related properties, whereas in supported films, there are no modes which show enhanced sensitivity to stress. In particular, evaluation of the dispersion (i.e., the wavevector dependence of the mode velocity or frequency) of the lowest-frequency mode in unsupported films allows the residual stress of the excited region to be accurately measured.

Figure 2A:
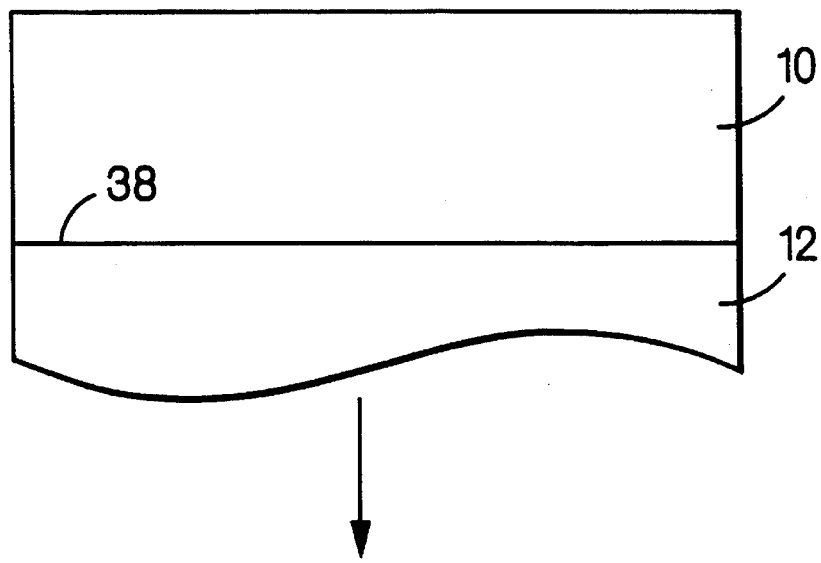
FIGS. 2A and 2B are, respectively, cross-sectional views of a thin film bound to a substrate prior to and following removal of a portion of the substrate.
Figure 2B:
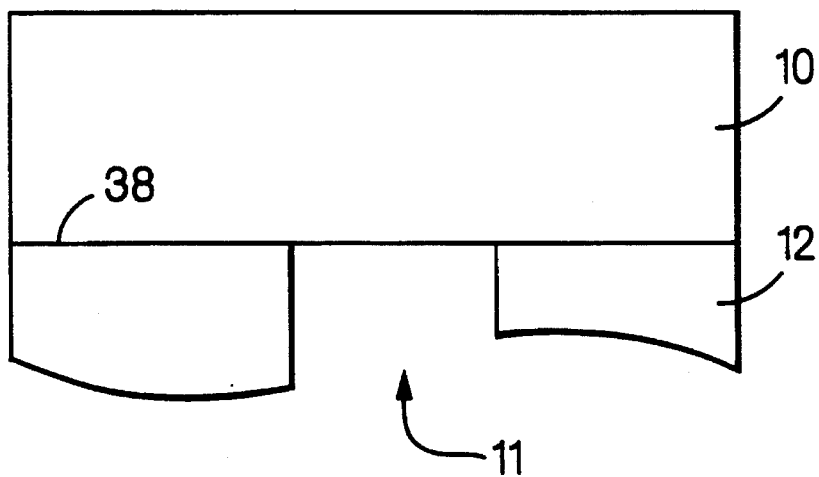

Referring now to FIGS. 2A and 2B, in preferred embodiments, prior to measurement, the unsupported region 11 of a thin film 10 attached to a substrate 12 (e.g., a silicon wafer) is generated by selectively removing a portion of the substrate after the film has been deposited. This can be accomplished using, for example, chemical etching techniques. Removal of the supporting substrate in this manner has no effect on the magnitude of the residual stress in the unsupported region. The size of the unsupported region 11 must be larger than the excitation spot size (which is typically on the order of about 100 microns in width and a few millimeters in length) while being small enough to prevent the film from sagging or buckling. Once a portion of the substrate 12 is removed, a portion of the unsupported region is optically excited with a wavelength which is partially absorbed by the film, thereby inducing Lamb modes, which are then detected. Data are then fit using the equations of motions derived from a physical model, described below. Residual stresses may be evaluated in other types of unsupported films, such as free-standing films which are stretched over a supporting structure.

In order to solve the equations of motions for the stressed system, the propagation characteristics of acoustic modes in an isotropic media are first determined. The equations of motion used in the calculation are derived starting with the acoustic field equations which generally govern material motion as described in M. Grimsditch et. al, Phys. Rev. Lett. 58:1216 (1987). The general differential equation is:

$$\rho \frac{\partial^2 u_i}{\partial t^2} - c_{ijkl}\frac{\partial^2 u_k}{\partial x_j \partial x_l} = 0 \tag{1}$$

where $\rho$ is the density, u is the displacement, and c is the stiffness tensor.

In this analysis, the coordinate system is defined such that the wavevector points in the y direction (direction index 3 in FIG. 1A). Next, the x and y directions (directions 1 and 3, respectively) are assumed to extend infinitely. These conditions are valid experimentally. As discussed above, the excitation beams are cylindrically focused to produce an elliptical spot in which the major axis is along the direction of the wavevector and is much longer than the fringe spacing; this allows the motions in the y direction to be assumed to be purely sinusoidal. Moreover, along the major axis, the probe beam size is small compared to that of the excitation beam; the derivatives along x can thus be ignored. The equations of motion then can be simplified to:

$$\rho \frac{\partial^2 u_y}{\partial t^2} - c_{11}\frac{\partial^2 u_z}{\partial y^2} - c_{44}\frac{\partial^2 u_z}{\partial z^2} - (c_{23}+c_{44})\frac{\partial^2 u_z}{\partial y \partial z} = 0 \tag{2}$$

$$\rho \frac{\partial^2 u_z}{\partial t^2} - c_{44}\frac{\partial^2 u_z}{\partial y^2} - c_{11}\frac{\partial^2 u_z}{\partial z^2} - (c_{23}+c_{44})\frac{\partial^2 u_z}{\partial y \partial z} = 0 \tag{3}$$

where the c's are elements of the stiffness tensor:

$$c_{ij} = \begin{vmatrix} c_{11} & c_{12} & c_{13} & 0 & 0 & 0 \\ c_{12} & c_{22} & c_{13} & 0 & 0 & 0 \\ c_{13} & c_{13} & c_{22} & 0 & 0 & 0 \\ 0 & 0 & 0 & c_{44} & 0 & 0 \\ 0 & 0 & 0 & 0 & c_{44} & 0 \\ 0 & 0 & 0 & 0 & 0 & \frac{1}{2}(c_{11}-c_{22}) \end{vmatrix} \tag{4}$$

The above analysis describing mode propagation is only valid when the residual stress in the film is negligible; this is often not the case, for example, in materials such as thermally cured spin-cast polyimide films. To account for the existence of residual stress in the film, the film's equations of motion, described in equation 1 above, include the effects of the residual stress tensor $\sigma^{(r)}$:

$$\frac{\partial}{\partial x_i}\left(\sigma_{ik}^{(r)}\frac{\partial u_j}{\partial x_k}\right) + \frac{\partial \sigma_{ij}}{\partial x_i} = \rho\frac{\partial^2 u_j}{\partial t^2} \tag{5}$$

Derivation of this equation is described, for example, by Nalamwar et al., "Surface acoustic waves in strained media", Journal of Applied Physics 47(1), pages 43–48 (1976).

This equation is solved by assuming that the densities of the film in the stressed and unstressed states are approximately equal. As an additional approximation, it is assumed that the residual stress is isotropic in the plane. This assumption is valid for most materials. For example, in spin-cast polyimide films, there is no preferential ordering along any particular direction in the plane, and the residual stress is isotropic. This makes it possible to set $\sigma_{xx}^{(r)} = \sigma_{yy}^{(r)} = \sigma_0^{(r)} = \sigma_0$. In addition, it is assumed that the stress is approximately depth-independent. Since out-of-plane motions of the polymer surface are not constrained, the out-of-plane component of the residual stress, $\sigma_{zz}^{(r)}$, can be assumed to be zero. Also, far from the substrate edges, where all measurements are preferably performed, it is assumed that all shearing stresses are zero. Finally, the calculation can be additionally simplified by making the important assumption that the elastic constants in the stressed material are equal to those in the unstressed material. That is, nonlinear terms in the constitutive relations between stress and strain are neglected. This approximation is justified, for example, based on the consistency of elastic measurements previously made in stressed and unstressed PMDA/ODA polymer films (see, for example, Allen et al., Applied Physics Letters, 51(4), pages 241–243 (1987)). Using these approximations, and using the coordinate system given in FIG. 1, the equations describing motion in a stressed medium are:

$$\rho \frac{\partial^2 u_y}{\partial t^2} - (c_{22}+\sigma_0)\frac{\partial^2 u_y}{\partial y^2} - c_{44}\frac{\partial^2 u_y}{\partial z^2} - (c_{23}+c_{44})\frac{\partial^2 u_z}{\partial y \partial z} = 0 \tag{6}$$

and $$\rho \frac{\partial^2 u_z}{\partial t^2} - c_{33}\frac{\partial^2 u_z}{\partial z^2} - (c_{44}+\sigma_0)\frac{\partial^2 u_z}{\partial y^2} - (c_{23}+c_{44})\frac{\partial^2 u_y}{\partial y \partial z} = 0 \tag{7}$$

The dispersion of Lamb mode propagation in stressed materials can be calculated by solving the equations of motion (described in equations 6 and 7) and using the appropriate boundary conditions at the free film surfaces. These boundary conditions require the surfaces of the film to be traction free, that is:

$$\sigma_{yz}|_{z=\pm d/2} = c_{44}\left[\frac{\partial u_y}{\partial z} + \frac{\partial u_z}{\partial y}\right] = 0 \tag{8}$$

$$\sigma_{zz}|_{z=\pm d/2} = c_{23}\frac{\partial u_y}{\partial y} + c_{33}\frac{\partial u_z}{\partial z} = 0 \tag{9}$$

where d is the thickness of the film.

The elements of the stiffness tensor and the value of the residual stress are determined by proposing a series of values for the stiffness tensor elements and the residual stress, and then calculating the waveguide mode phase velocities by finding the position of zeroes in a 6×6 determinant which is a function of only the wavevector/thickness product. The specific form of this determinant is given in the computer code included in appendix A; the code allows for finding the zero values of the determinant for unsupported films. The determinant is defined by imposing the above boundary conditions at the two film interfaces, and performing a Laplace transform of the determinant along t, a Fourier transform along z, and postulating solutions to $u_y$ and $u_z$ of the form $\sim\exp(iqby)$, where b is unknown. The match between calculated and measured phase velocities is optimized by varying the stiffness tensor elements and the residual stress using a non-linear least-squares fitting algorithm, such as a Marquardt-Levenburg algorithm.

Figure 3A:
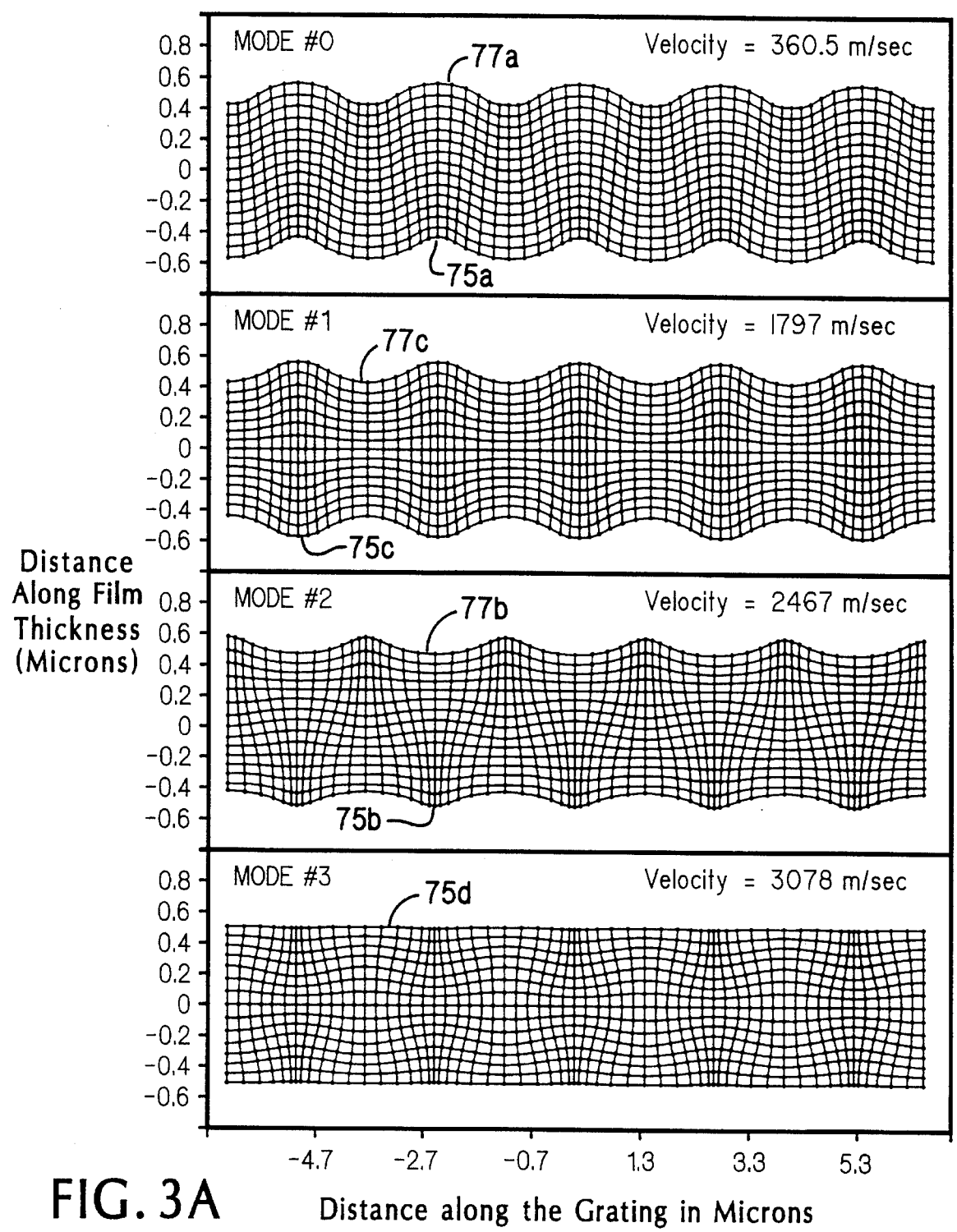
FIGS. 3A–3C are, respectively, grid-distortion diagrams of the four lowest Lamb modes in a polyimide film when the wavevector/thickness product is 2.5, a grid-distortion diagram of the lowest-order Lamb mode, and an expanded grid-distortion diagram showing the in and out-of-plane motions of the lowest-order Lamb mode.
Figure 3B:
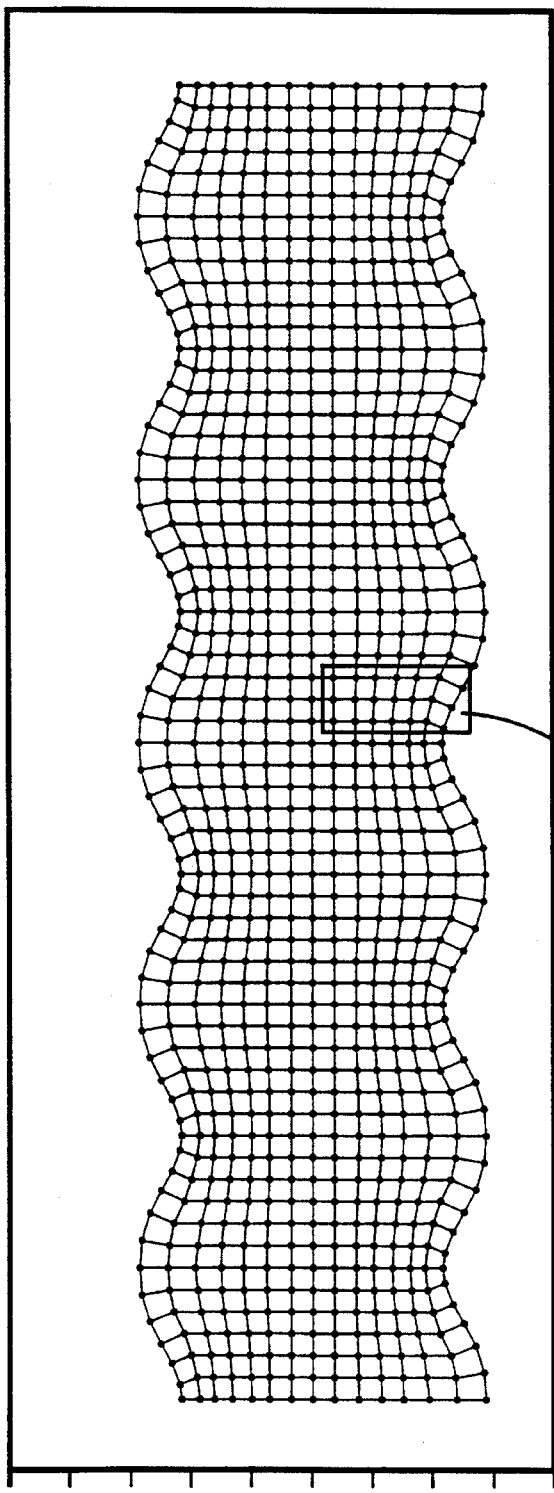
Figure 3C:
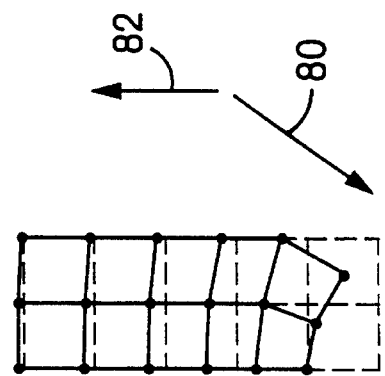

Referring now to FIGS. 3A–3C, Lamb modes propagating in an unstressed film are illustrated. The excitation of the waveguide modes gives rise to material displacements in the film (shown schematically by the spatially varying grid in the figures) which include in 75a–75d and out-of-plane 77a–77c displacements in the film. The lowest four waveguide modes which propagate in a typical unsupported polyimide film at a wavevector/thickness product of 2.5 are illustrated in FIG. 3A. The propagation speeds for each mode are shown in the figure insets. The number, velocity and spatial character of these modes scales with the product of the acoustic wavevector and the film thickness.

Although the waveguide modes generated in the film all propagate along the film's surface, the motions associated with each mode involve shear and longitudinal strains both in and out of the plane of the film. Referring now to FIGS. 3B and 3C, a diagram of the lowest-order waveguide mode in the large wavevector/thickness limit illustrates the in (indicated by the arrow 80) and out-of-plane (indicated by the arrow 82) shear and longitudinal motions associated with this mode.

There are two principal features common to Lamb mode propagation in both stressed and unstressed films. First, the Lamb mode phase (and group) velocities scale with an effective or dimensionless thickness determined by the product of the wavevector and the film thickness. Thus, these modes can be characterized as a function of the wavevector/thickness product. In addition, for unsupported films, the dispersion is not a function of the residual stress or the elastic constants themselves, but rather is a function of these quantities scaled by the film density. Therefore, mention of the elastic constants or the stress in reference to thin films implies that the values of these parameters are scaled by the film's mass density.

Figure 4A:
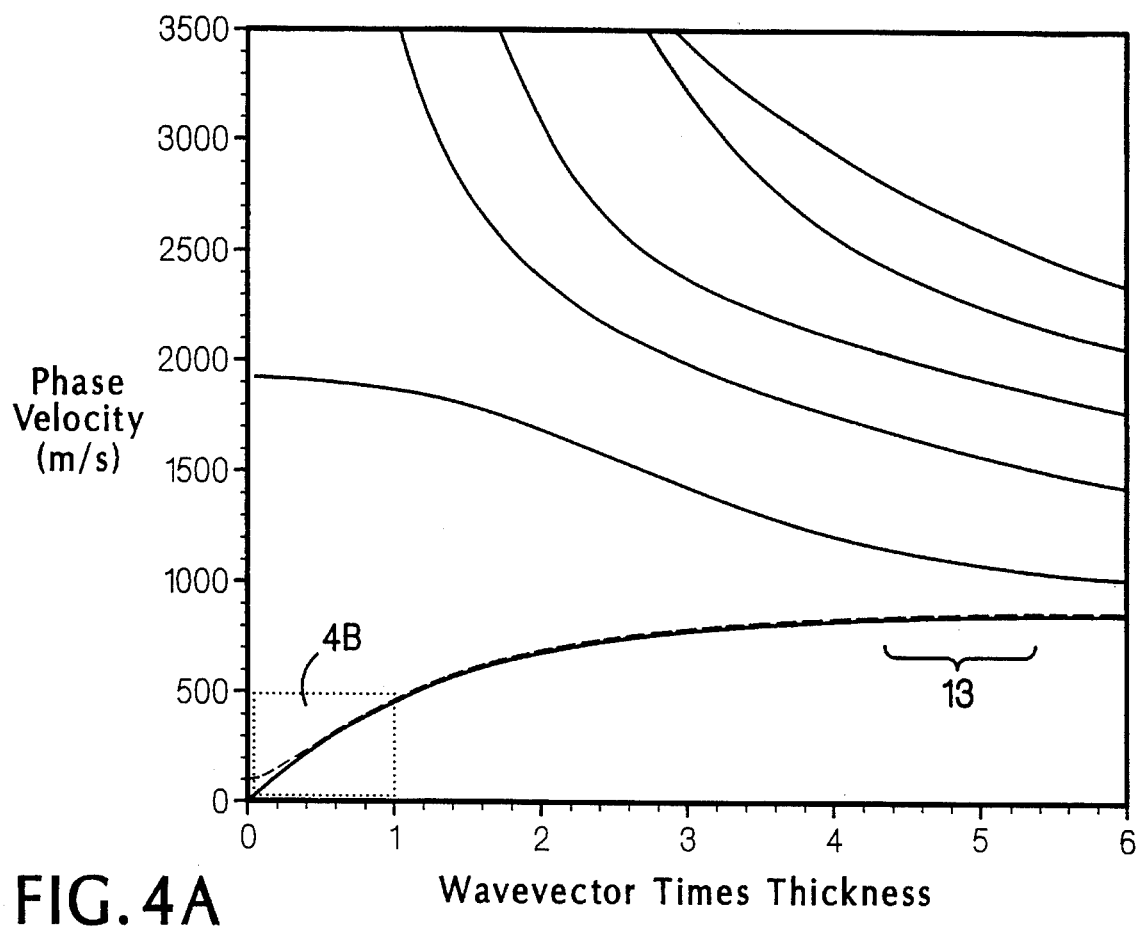
FIGS. 4A and 4B are plots of the calculated dispersion for Lamb mode propagation in stressed (dotted lines) and unstressed (solid lines) films.
Figure 4B:
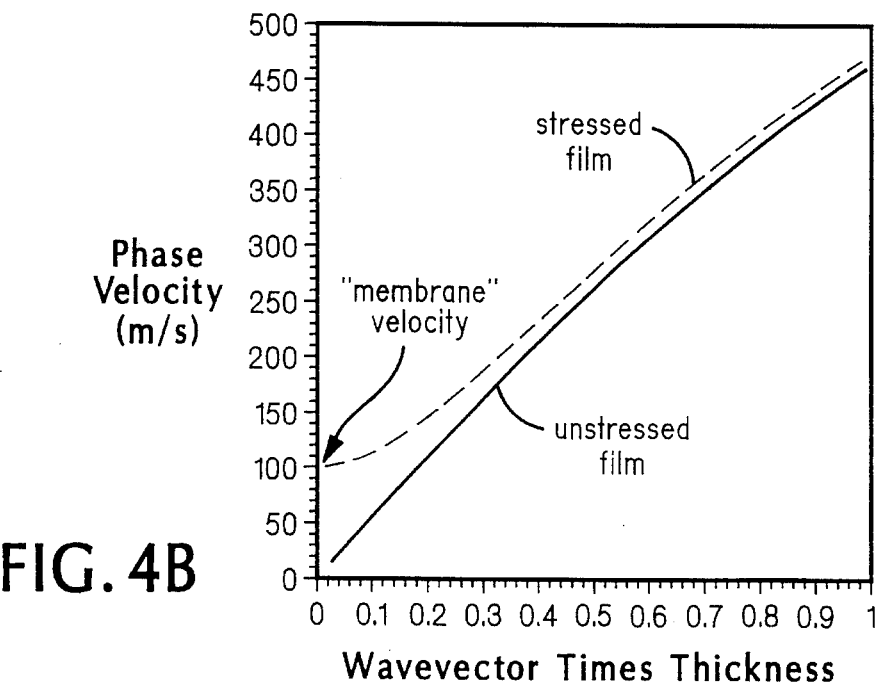

With reference now to FIGS. 4A and 4B, the calculated dispersion of the Lamb modes, shown as the plots of the phase velocity vs. wavevector/thickness product of the film, can be determined as described above for stressed (i.e., non-zero stress tensor elements) and unstressed (i.e., all stress tensor elements are zero) films. Each solid curve in FIG. 4A corresponds to a distinct Lamb mode in an unstressed film; the actual motions of each mode are indicated by the grid-distortion diagrams shown in FIGS. 3A–3C. The dotted curve corresponds to the lowest order Lamb mode in a stressed film. The lowest-order mode for the unstressed film has anti-symmetric in-plane displacements, and its velocity decreases to zero as the wavevector/thickness product approaches zero. The second-lowest mode is symmetric in the in-plane displacement and its velocity increases as the wavevector/thickness product decreases. In the large wavevector/thickness limit, indicated in the figure by the bracket 13, the dispersion of the stressed film (dotted curve) is nearly identical to that of the unstressed film (solid curve), indicating that the film's mechanical properties dictate waveguide properties, and that the effects of stress in this limit are basically negligible. During the measurement process, this property can be used to advantage; dispersion of the unsupported film is preferably first measured in the regime 13, and is then analyzed to determine the mechanical properties of the film. This regime, called the "thick film" regime, typically occurs when the wavevector/thickness product is between about 3 and 10. During the actual measurement process, the thick film regime is achieved simply by adjusting the wavevector of the excitation field. Once the dispersion and mechanical properties in the thick film regime (or along higher-order modes in either the thick or thin film regimes) are determined, the excitation wavevector is decreased to a point where the wavevector/thickness product is less than the acoustic wavelength (i.e., the "thin film" regime; shown exclusively in FIG. 4B) and the dispersion is determined. In the thin film regime, the dispersion of the lowest-order mode is significantly affected by both the mechanical and residual stress properties of the film. In addition, the "very thin film" regime is the region of dispersion where the wavevector/thickness product is about 0.05 or less, depending on the magnitude of the stress. In this region, the phase velocity of the lowest-order Lamb mode is directly related to the magnitude of the residual stress. For films having larger residual stress values, the cutoff for the very thin film regime may occur at a slightly larger wavevector/thickness product.

Referring exclusively now to FIG. 4B, the effects of stress on the mechanical properties of thin films in the thin and very thin film regimes are indicated by the difference in dispersion between the stressed and unstressed films. In particular, for the lowest-order Lamb mode in these regimes, the difference between phase velocities of stressed and unstressed films is maximized; for all values of the wavevector/thickness product, the stressed film has a higher phase velocity than the unstressed film. More importantly, in the very thin film regime, the phase velocity of the lowest-order mode in the stressed film begins to approach a non-zero value which is determined only by the magnitude of the residual stress. Conversely, in the corresponding limit for the unstressed film, the phase velocity approaches zero.

Therefore, in one embodiment, in order to measure a film's residual stress in an ISTS experiment, the phase velocity dispersion of the lowest-order mode is measured in the thin or very thin film regime. In this way, the maximum effects of stress can be observed; the effects of the film's elastic constants on the dispersion are minimized. Similarly, the elastic moduli of the film can be determined independently of the residual stress by measuring the waveguide dispersion of modes other than the lowest-order mode at small wavevector/thickness products, or the dispersion of any of the modes in the thick film regime. The elastic properties obtained by fitting the dispersion in the thick film regime or the higher-order modes in either the thick or thin film regimes are then held fixed during the fitting of data measured in the thin film regime, and only the value of residual stress is allowed to vary. In this way, the stress is quantified. The stress may be determined directly in the very thin film without having to analyze the film's mechanical properties.

Figure 5:
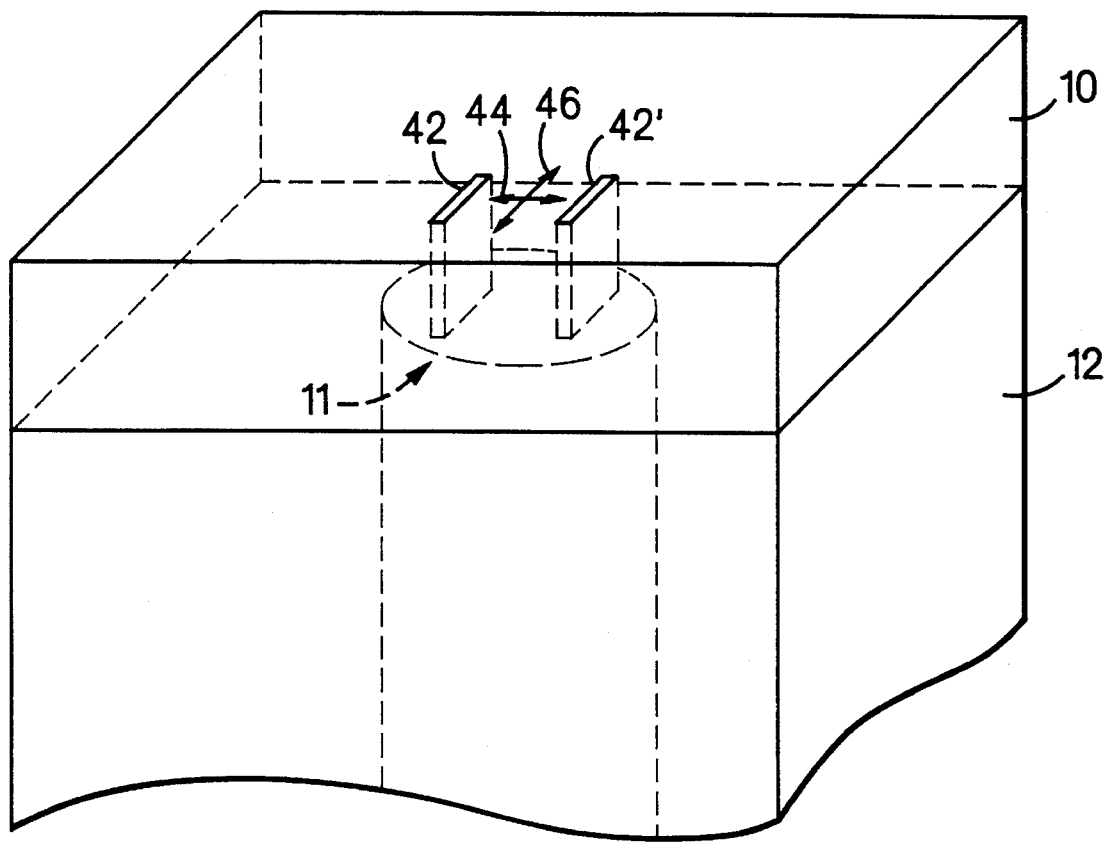
FIG. 5 is a perspective view of a cut thin film bound to a substrate with a removed portion.

With reference now to FIG. 5, in samples wherein the thin film regime cannot be achieved (i.e., in cases where the optical wavelength of the excitation field is such that small wavevector modes cannot be stimulated), cuts or slits 42, 42' can be made in the unsupported region 11 of the film 11, thereby allowing stress relaxation in the direction perpendicular to the direction of the cuts (indicated by the arrow 44), while permitting only partial relaxation in the orthogonal direction (indicated by the arrow 46). Preferably, the cuts go completely through the thickness of the film. Cutting the film in this manner, therefore, increases the anisotropy in the residual stress. In this specially fabricated sample, Lamb modes can be generated as described above, with mode propagation occurring in the two orthogonal directions. In the cut samples, the frequency of modes propagating parallel to the cuts will be consistently higher than the frequency of modes propagating perpendicular to the cuts. The frequency shift is due solely to the residual stress, and, along with the values of the elastic constants determined by fitting the waveguide dispersion, has a magnitude which can be used to directly quantify the stress. In these specially fabricated samples, as before, the elastic properties obtained by fitting the dispersion in the thick film regime or along any higher-order modes are used along with the anisotropy of the Lamb mode phase velocity to quantify the stress. In order to directly compare the residual stresses in these specially fabricated samples to those of unmodified samples, Poisson's ratio and the measured value of uniaxial stress are used, i.e., the stress in the unmodified film is equal to the stress in the region between the cuts in the modified film divided by one minus the Poisson ratio.

Preferably, in this embodiment, cuts should be separated by a distance on the order of between 3 and 100 times wavelength of the excited Lamb mode. In order to minimize edge effects associated with stress relaxation near the cut's edges, the length of each cut should be roughly 3 times the cut separation. A typical cut size is roughly one centimeter in length by 5–10 microns in width, with the separation between cuts being on the order of 3 millimeters. Cuts can be made using any cutting device (e.g., a razor blade).

Figure 6:
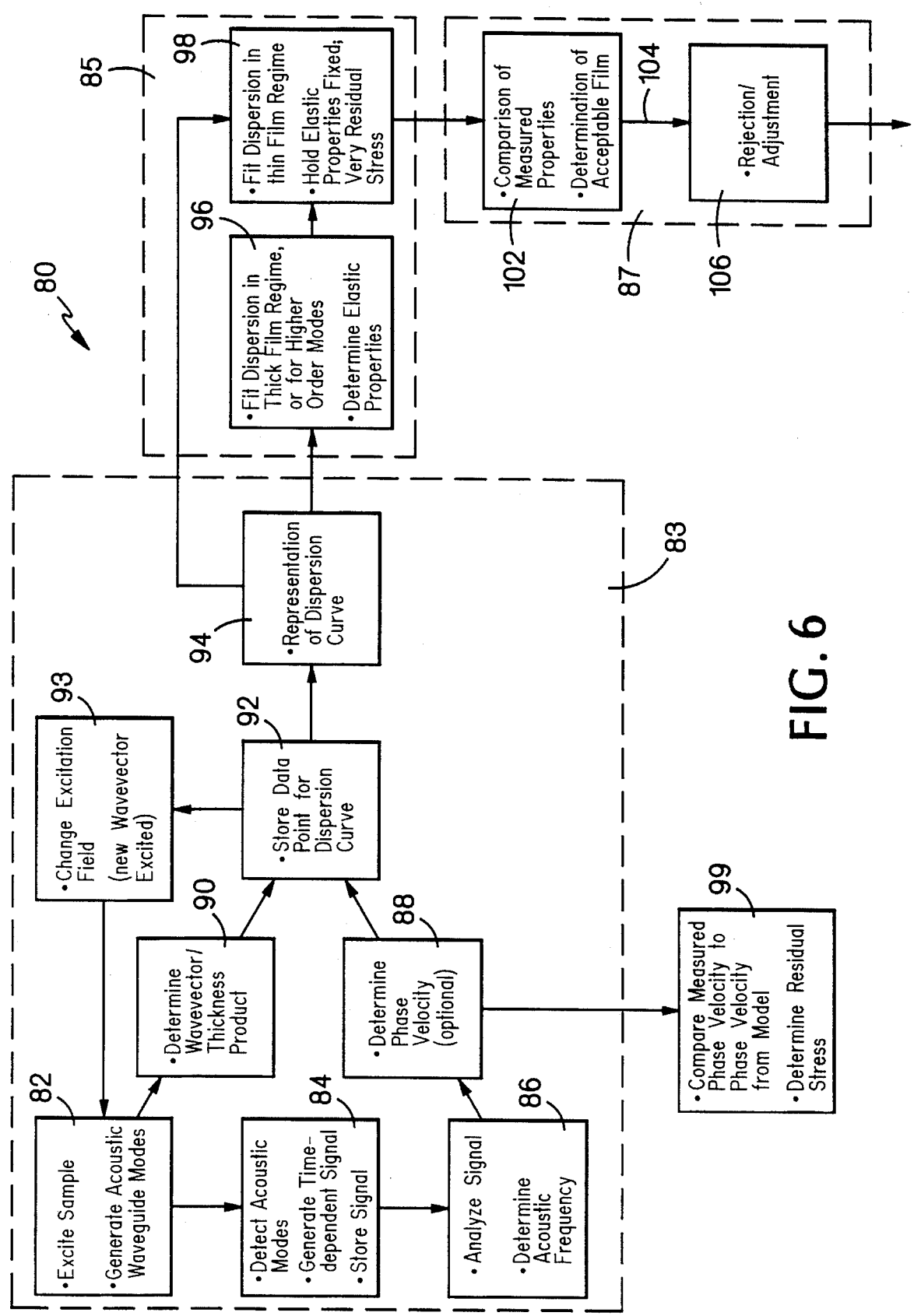
FIG. 6 is a block diagram of the method steps used for determining the stress in a thin film.

Referring now to FIG. 6, in preferred embodiments, the method 80 used to determine the stress-related mechanical properties of a film includes a series of data generation steps 83, described above, used to measure and store the dispersion characteristics of a particular film, and a series of data analysis steps 85, also described above, for analyzing the resulting data to determine the mechanical stress of the film. Preferably, the data generation 83 and analysis 85 series of steps are performed in both the thin and thick film limits in order to allow absolute determination of the stress-related properties of the film. Once these properties are determined, a series of process control steps 87 allow, for example, the film-containing device to be accepted or rejected, or a film-fabrication process to be adjusted on the basis of the determined film properties.

The data generation steps 83 begin with an optical excitation step 82, as described above, involving irradiation of the film with the spatially periodic, time-dependent optical field. As described above, the irradiated film is unsupported. If stress-related properties are undetectable (i.e., even at the lowest obtainable wavevector only the thick film regime can be achieved), the unsupported sample may be incised with two parallel cuts, as described above, in order to induce a stress-related anisotropy in the film. Following excitation, a sampling step 84 using a probe laser pulse is used to monitor the excited Lamb modes, and the diffracted component of a probe pulse is detected using a high-bandwidth photodetector, thereby producing a light-induced signal having features indicating the dynamical behavior of the excited Lamb modes. After detection, the signal is measured with a digital-signal analyzer, and stored in a computer as an array of x–y points. A single laser shot can be detected, or, in order to increase the signal-to-noise ratio of the detected signal, multiple shots can be detected, averaged, and then stored in a computer. Once in a suitable form, the stored time-dependent signal is processed with an analyzing step 86 which involves the use of a numerical algorithm to determine the frequencies of the excited waveguide modes. Most preferably, fast Fourier transform routines (FFT) or linear prediction algorithms known in the art, such as those described in *Numerical Recipes in C* (1994), are used with the computer to process the x–y array of points. The FFT of the time-dependent signal yields a frequency which may then be processed 88 to determine the phase velocity of one or more of the excited waveguide modes.

In addition to the phase velocity, the wavevector of the Lamb mode and the film thickness are used to determine the mode dispersion. The wavevector (q) magnitude may be determined 90 by measuring the angle θ between the excitation beams having a wavelength $\lambda_1$ using the equation $q=4\pi\sin(\theta/2)(\lambda_1)^{-1}=2\pi/\Lambda$, where $\Lambda$ is the grating wavelength. Alternatively, when, as described herein, a single-beam excitation is used, the wavevector of the excited mode is related to the pattern etched or deposited onto the mask.

The thickness of the film can be determined prior to the wavevector calculation step 90 using techniques known in the art, such as the optical ellipsometry or stylus prolifometry. In addition, as discussed above, the film thickness can be determined by including "thickness" as an additional unknown parameter in the fitting algorithm.

Once determined, the phase velocity and wavevector/thickness product are stored 92 (in, e.g., a computer memory) as a data point; if more than one waveguide mode is excited by the excitation pulses at a particular wavevector (i.e., multiple frequencies are present in the light-induced signal), a data point is generated for each mode. If more data points are desired, a new spatially varying excitation field is generated 93 and used to excite the film at a different wavevector. Alternatively, using the single-beam excitation method, an excitation pattern including multiple wavevectors can be used to excite the film. This allows excitation of phonons having multiple wavevectors using a single excitation field. The initial steps 82–93 of the data generation processes 83 may be repeated, if necessary, until a substantial amount of data points are generated and stored in the computer. Typically, four (if the thickness is known) or five (if the thickness is unknown) data points are used. Once generated, the series of data points are collected and stored 94 as an array of x–y values in the computer memory. This data represents the optically measured dispersion curve for the Lamb modes excited in the film.

Using the series of data analysis steps 85, the x–y array of data points are fit 96 using a numerical function generated from the series of matrix equations describing the acoustic properties of transverse isotropic media as discussed above. During step 96, the elastic properties alone are preferably determined in the thick film regime or for any higher-order modes in either the thick or thin film regimes. Using the data generation steps 83, the dispersion of the lowest-order mode can be measured in the thin film regime. These data are then fit 98 by varying only the residual stress, with the elastic properties determined during step 96 being held fixed. This allows the stress-related properties to be quantitatively determined. Alternatively, the phase velocity of the lowest-order mode can be determined 99 in the very thin film regime, and then can be used to directly determine the residual stress.

At this point, if the desired stress-related properties are determined with acceptable accuracy, the series of process control steps 87 may be executed. Alternatively, it may be necessary to repeat the data generation 83 and analysis 85 steps in order to more accurately determine the stress-related properties of the film. Once this is done, the process control steps 87 may then be carried out.

In both cases, calibration of the system prior to the measurement process allows the relationship between the measured residual stress and film quality to be determined. For example, in step 102, the residual stress in films having desired lamination properties can be determined in a separate experiment, and used as a "benchmark" to which measured residual stresses can be compared to. This allows the residual stress for a particular film to be monitored during the process control steps 87, and then compared to the benchmark in order to gauge the desirability of the film. Alternatively, mechanical properties related directly to the residual stress in the film, such as the shear and longitudinal speeds of sound, may be determined using the method and then compared to similar speeds of sound measured in films having acceptable and unacceptable residual stress values.

In both cases, if the comparison 102 indicates an unacceptable film, a signal 104 may be sent to the process controller, resulting in rejection 106 of the film-containing device. Similarly, such a measurement can be made during fabrication (i.e., curing) of the film. If analysis during any fabrication step indicates that films with unacceptable stress values are being fabricated, the signal 104 is sent to the process controller, resulting in adjustment of the parameters of the fabrication method. This process can be repeated iteratively until films having the desired properties are formed.

Preferably, as described above, Lamb modes are optically excited in the film using one of two optical excitation systems. In both cases, an excitation light source, such as a laser, is used to generate an excitation beam including a series of optical pulses. If the carrier frequency of the pulses is below the absorption energy of the film, the optical beam may be passed through one or more non-linear optical devices, such as a frequency-doubling or frequency-tripling crystal, which can be used to generate higher-order harmonics (e.g., second or third harmonics) of the fundamental frequency.

In one embodiment, when the excitation pulse is of suitable frequency, it is passed through a series of beam-splitting optics which allow generation of two excitation beams, each containing pulses having durations, e.g., between about 0.1 and 1 ns. Once generated and separated, the pulses of suitable carrier frequency and time duration are preferably focussed by a lens onto the surface of the film at an angle, where they are overlapped in time and space. As described above, adjustment of the angle between the beams allows the excitation wavevector to be changed. Optical interference between the overlapped pulses gives rise to a spatially varying intensity pattern which can be used to excite Lamb modes in the film.

In another preferred embodiment, the excitation wavevector is formed by passing a single excitation beam through an optical modulating system. Briefly, this device provides a simple, linearly configured optical system which modulates a single excitation beam (similar to either of the excitation beams used in the two-beam method) with a series of diffracting and spatially filtering masks to produce a pair of excitation sub-beams which are recombined within or on the surface of the sample. The optical modulating system is configured so that the timing and spatial positions of the excitation sub-beams are overlapped, resulting in optical interference between the two sub-beams to produce a spatially varying optical field which is then used to excite the sample. In addition, in this embodiment, the wavevector of the excited phonons can be adjusted simply by changing the masks. Thus, the masks are the only moving parts in the system, allowing the measurement technique to be easily automated while reducing the number of optics required in the optical modulating system. Moreover, use of this embodiment allows more complex spatially varying excitation patterns to be formed on the film; this can be used, for example, to generate multiple excitation wavevectors within a single pattern.

In either case, following excitation, the Lamb modes are counter-propagating and give rise to coherent spatial displacements in the irradiated region of the film, resulting in a time-dependent signal including a damped oscillatory component. The thermal response of the film gives rise to a quasi-steady-state material response which persists until thermal diffusion washes out the temperature grating.

The time-dependent properties of both the Lamb modes and thermal response are recorded in real-time by monitoring the time-dependent diffraction of the probe beam, which is preferably derived from a continuous wave (cw) single-mode laser. In order to measure the entire time dependence of the induced anisotropic motions of the film (which, e.g., may take place over several hundreds of microseconds), a well-defined probe waveform may be generated by electro-optically modulating the cw probe beam with a modulator. In this case, both the duration and shape of the probe waveform are controlled by the modulator. Preferably, the square optical pulse has a time duration slightly longer than the duration of the time-dependent motions in the film.

Once generated and suitably modulated, the probe beam may then be passed through or reflected off of additional optical components, such as mirrors, frequency and spatial filters, frequency-doubling crystals, or telescoping lenses, in order to achieve the desired spatial, energy, and intensity profiles. In the two-beam excitation method, the probe pulse is preferably focussed on the film using a lens in order to sample the induced material displacements. In this embodiment, the excitation and probe beams may be arranged so that a single lens is used to focus all three beams.

In the embodiment where the optical modulating system is used, the probe beam is automatically adjusted to the Bragg angle (i.e., the angle at which the diffraction efficiency of the transient grating is maximized) when a 1:1 imaging system is used by making this beam collinear to the excitation beam prior to entering the modulating system. The probe beam is then diffracted by the same mask used to modulate the excitation beam, thereby producing two probe sub-beams, which can then be spatially filtered by the second mask. In this case, one probe sub-beam can be used to probe the transient grating, while the other sub-beam may serve as a "finder" beam to determine the position of the signal beam. This makes the practical matter of aligning weak signals into the detector trivial since the finder beam has a large optical intensity relative to the diffracted signal beam, and is thus easy to locate. In addition, one of the sub-beams may be heterodyned against the signal beam from weakly diffracting samples to provide optical amplification.

In either embodiment, the diffracted probe waveform is preferably detected with a time-resolving photodetector housed in the optical detection mechanism. This allows the entire time dependence of the excited region of film to be measured with a single probe waveform. For especially weak signals, a lens may be used to focus the diffracted beam onto the optically active region of the detector, thereby increasing the intensity of the signal. For particularly noisy or weak signals, signal-enhancing electronics, such as high-speed amplifiers, may be used with the optical detection component.

The following are examples of the analysis of the residual stresses in thin PMDA/ODA polyimide films.

EXAMPLES

Sample Preparation

Three PMDA/ODA polyimide film-silicon substrate samples were fabricated by spin coating and fully curing Dupont's PI2545 precursor solution onto 10-cm diameter silicon wafers. The thickness of each sample was determined by the spin speed and was measured with a DEKTAK 8000 stylus profilometer after the cure. The samples had thicknesses of 2.55, 5.08, and 7.29±0.05 microns. After the thicknesses were recorded, each sample was loaded into a teflon jig. Two identical holes in the side of the jig that contacts the silicon side of the sample defined the areas to be etched. A 6:1:1 mixture of $HF:HNO_3:CH_3COOH$ etchant was poured into the wells formed by the holes in the jig and, within 5 minutes, the acid mixture removed the silicon in these regions. (It has been demonstrated previously that this procedure does not alter the intrinsic properties of the polyimide film nor does it change the residual stress. See, for example, *Polyimides: Materials, Chemistry, and Characterization*, Maseeh et al., Elsevier Science Publishers, pages 575–586 (1989).) After the etch, the samples were rinsed with deionized water and were allowed to dry for 48 hours in a desiccator.

The samples resulting from this procedure consisted of polyimide-coated 10-cm silicon wafers with a pair of 2.5-cm holes in each wafer. Two sets of experiments were conducted on these samples. First, using the two-beam method, for each excitation angle data were collected in two different regions in each of the two areas where the silicon was etched away. Residual stresses were then determined using the analysis method described herein. Significant property variation from spot to spot was not observed within one etched region or between the two etched regions. Moreover, there was no observation of property changes over the time during which experiments were conducted.

After this first set of experiments was completed, two parallel cuts in the unsupported regions were made for residual stress measurements. These cuts allowed the stress perpendicular to the direction of the cuts to relax completely, and allowed the stress in the direction parallel to the cuts to only partially relax. As a result, the region of film between the cuts was left in an anisotropic stress state. To investigate the influence of residual stress on the Lamb mode phase velocities in these specially fabricated structures, ISTS was used to measure phase velocities as a function of acoustic wavelength for wave propagation perpendicular and parallel to the cuts. For each angle between the excitation beams, and for each of the two propagation directions, measurements were made at two different spatial locations on the film between the cuts. The cuts were approximately 1.2 cm long and were separated by about 0.4 cm. They were made twenty-four hours before beginning the second set of experiments. All experiments were completed twenty-four hours after they were started.

Optical System

In the data reported, Lamb modes in the film were excited using a Q-switched, mode-locked, and cavity-dumped Nd:YAG laser. The output pulse had an energy of 1 millijoule, a wavelength of 1064 nm, a pulse duration of 100 ps, and a repetition rate of up to 1 Khz. Light from this laser was first attenuated and then passed through a lithium triborate (LBO) crystal to yield light at 532 nm, which was then mixed with the remnant 1064 nm radiation in a β-barium borate (BBO) crystal to yield excitation pulses of approximately 20 microjoules at 355 nm. This light was attenuated to yield ~1 microjoule pulses that were used for excitation of the films. During excitation, the 355-nm pulses were passed through a 50% beam splitter and then crossed at the angle θ. Excitation pulses were focussed using a cylindrical lens to produce a beam size on the film of about 1 cm (z direction) by 300 microns (x direction).

Material motions in the film were recorded in real-time by monitoring the time-dependent diffraction of a probe pulse spatially overlapped with the interference pattern produced by the excitation pulses. The probe pulse was derived from a cw single-mode Argon ion laser (Lexel 3500) producing 1 Watt at 514 nm with a flat intensity profile. This output was electro-optically modulated (Conoptics 380) to yield a square pulse having a temporal width of between 1 and 20 microseconds. The probe beam was focussed to a circular spot of between 50 and 70 microns in diameter in the film. The diffracted component of the probe beam was measured with a fast amplified photodiode (Antel—2 GHz bandwidth). The light-induced signal was then sent to a transient digitizer (Tektronics DSA 602A—1 GHz bandwidth), resulting in generation of digital signal for analysis. The combination of the photodiode and transient digitizer effectively provided a 1 GHz-bandwidth window through which the film's oscillatory and relaxational motions were monitored.

In the set of experiments described herein, data was collected at crossing angles which correspond to grating wavelengths Λ of 58.11, 38.74, 28.29, 27.12, 25.30, 23.93, 19.35, 18.21, 16.04, 15.33, 13.75, 12.76, 12.41, 11.04, 10.06, 10.03, 9.05, 8.67, 8.37, 7.49, 7.36, 6.82, 6.67, 6.33, 5.74, 5.67, 5.39, 5.12, 5.11, 4.94, 4.64, 4.56, 4.29, 4.18, and 3.89±0.05 microns. The grating wavelength is inversely related to the excitation wavevector q by the equation $q=2\pi/\Lambda$. The grating wavelengths were determined using an optical microscope to measure burn marks produced by exposing a blank silicon wafer to unattenuated excitation pulses.

Data

Figure 7A:
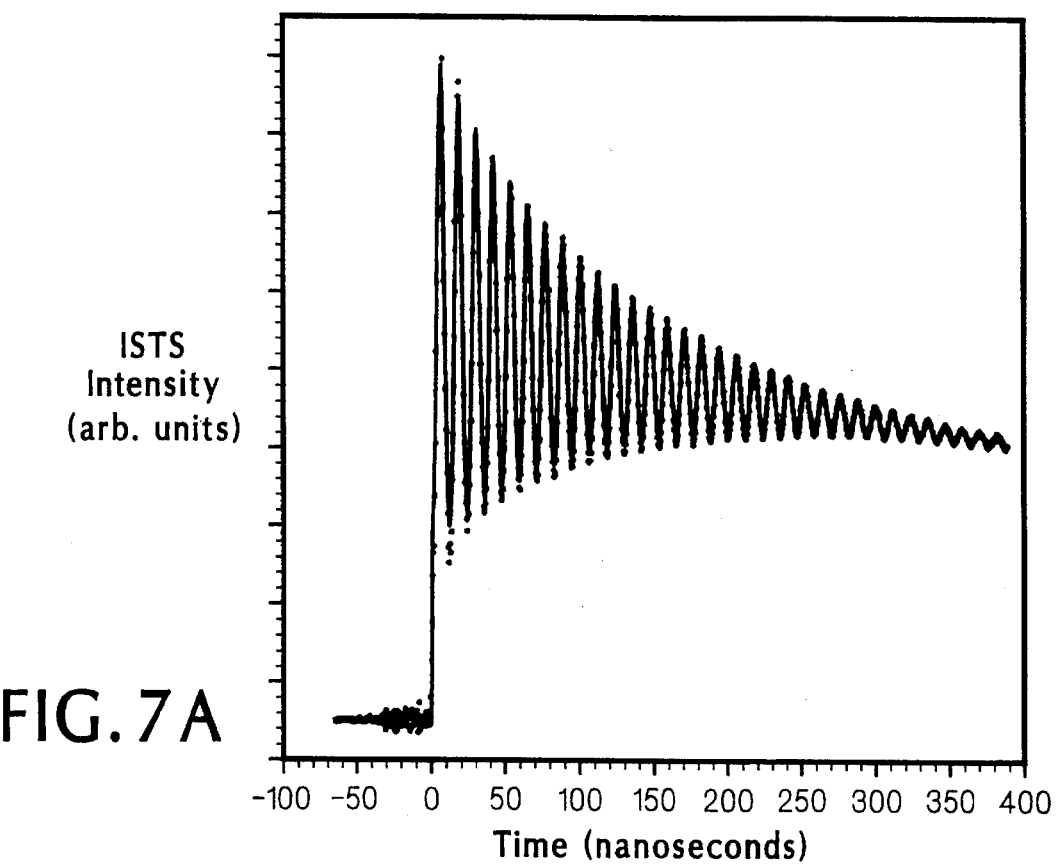
FIGS. 7A and 7B are plots showing typical time-dependent diffracted signals measured according to the method of the invention in, respectively, the nanosecond and microsecond time regimes.
Figure 7B:
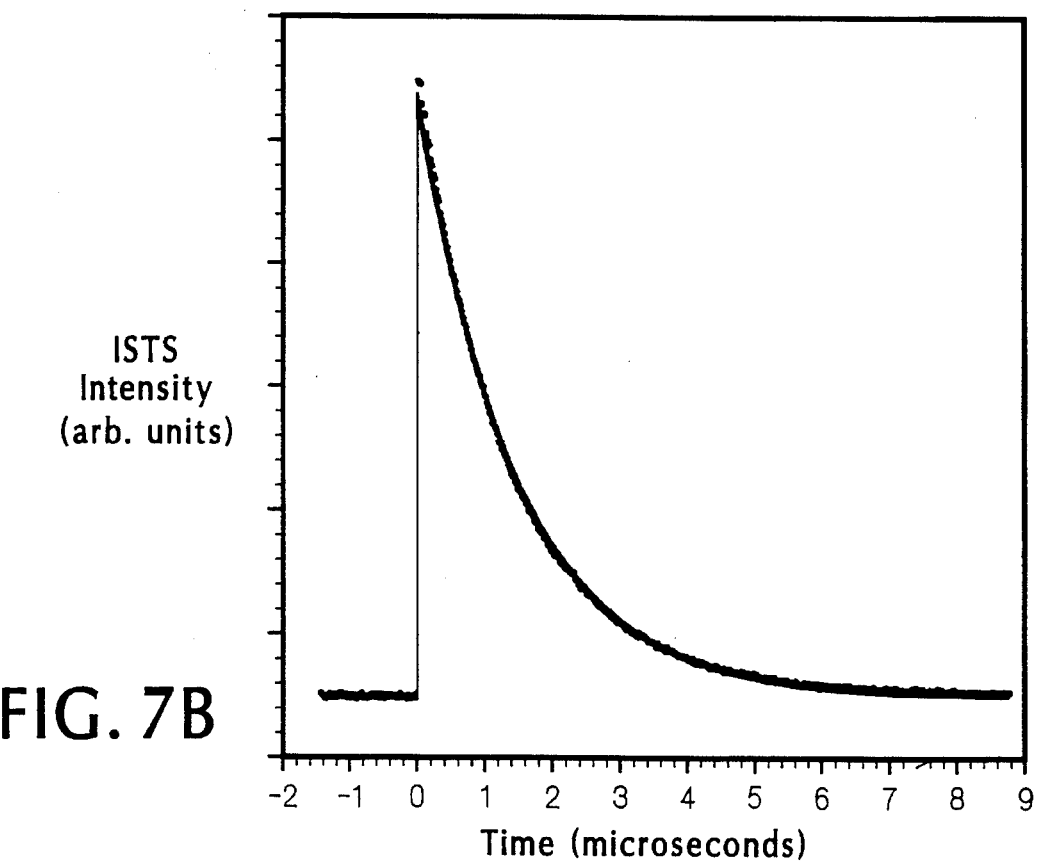

Typical data collected from the PI2545 free-standing film samples, along with fits based on approximations to the material response, are shown in FIGS. 7A and 7B. The plot in FIG. 7A illustrates acoustic wave propagation in the thin film media; this motion is oscillatory in nature and is typically damped out due to viscous losses in the film after several hundred nanoseconds. As indicated by the calculated dispersion curves shown, for example, in FIGS. 4A and 4B, the frequency of oscillation and the damping rate depend on the wavevector of the propagating mode. The decay plotted in FIG. 7B illustrates the in and out-of-plane thermal diffusion which occurs in the film and washes out the diffraction efficiency of the transient grating on microsecond time scales. Experiments were performed at all the excitation wavevectors described above. Determination of the oscillation frequency at each wavevector allowed the mode dispersion to be mapped out.

The measured dispersion was then compared to results of calculations based on a model of an isotropic, stressed film using a nonlinear-least-squares fitting routine. Depending on the portion of the dispersion curve being investigated, this allows the film's mechanical and stress-related properties combined (i.e., the thin film regime) or mechanical properties alone (i.e., the thick film regime or along any higher-order modes in either the thick or thin film regime) to be obtained. The following procedure was used for fitting: data from higher-order modes and from the lowest-order mode at large (i.e.,>2.0) wavevector/thickness values (i.e., the thick film regime) were fit to determine the elastic properties while holding the residual stress fixed. The dispersion of the lowest-order mode at small wavevector-thickness products was then fit, allowing the residual stress values to float while holding the elastic moduli fixed. These two steps were repeated in an iterative manner until the residual stress and the elastic moduli no longer varied.

With this procedure was found that the fitted residual stress was well determined (i.e. uncertainties are less than roughly thirty percent of the best-fit value) in the 2.55 micron sample, but are not well determined in the 5.08 or 7.29-micron samples. This is almost surely a result of the fact that with the current experimental configuration, it is very difficult to reach the excitation wavevectors necessary to achieve the thin film regime required for accurate residual stress determination in the thicker samples. Equally important, in all samples it was found that when all data is used for fitting, the fitted elastic moduli are very nearly equal whether the residual stress is included or not. This is a result of the range of wavevector/thickness values probed, and the fact that the velocities of the stress-insensitive higher-order modes are used in the fitting procedure.

Figure 8A:
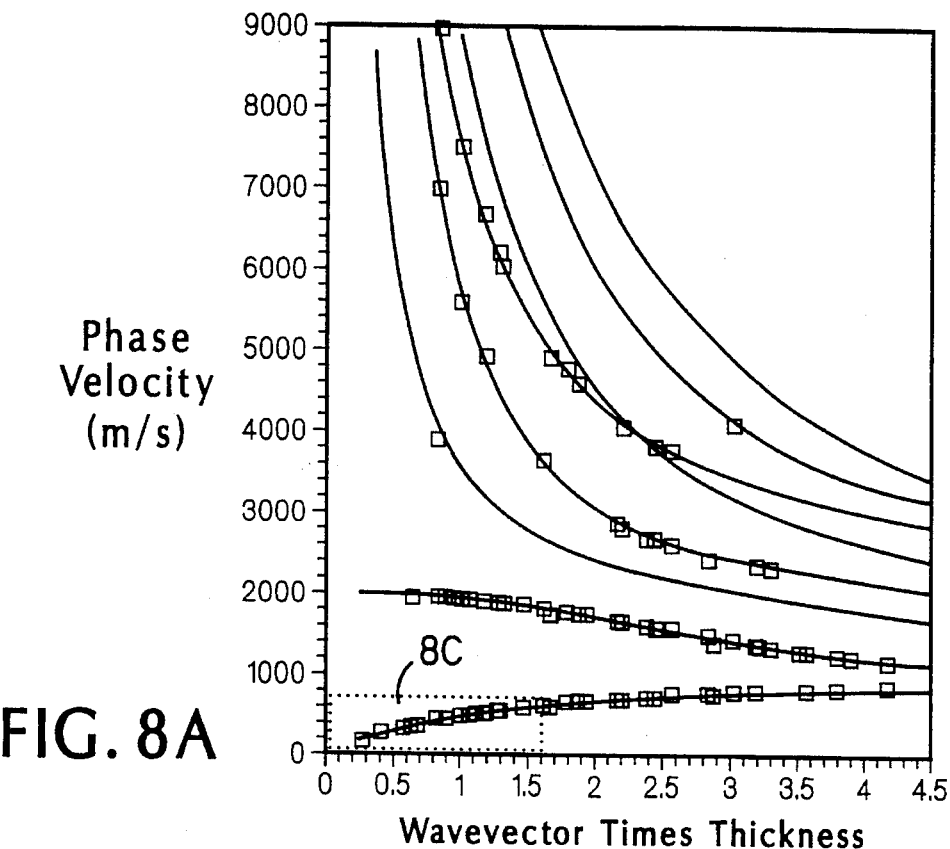
FIGS. 8A and 8C are plots showing measured phase velocities (boxes) of a 2.55-micron polyimide film compared to numerical fits (solid lines) which include the effects of residual stress.
Figure 8C:
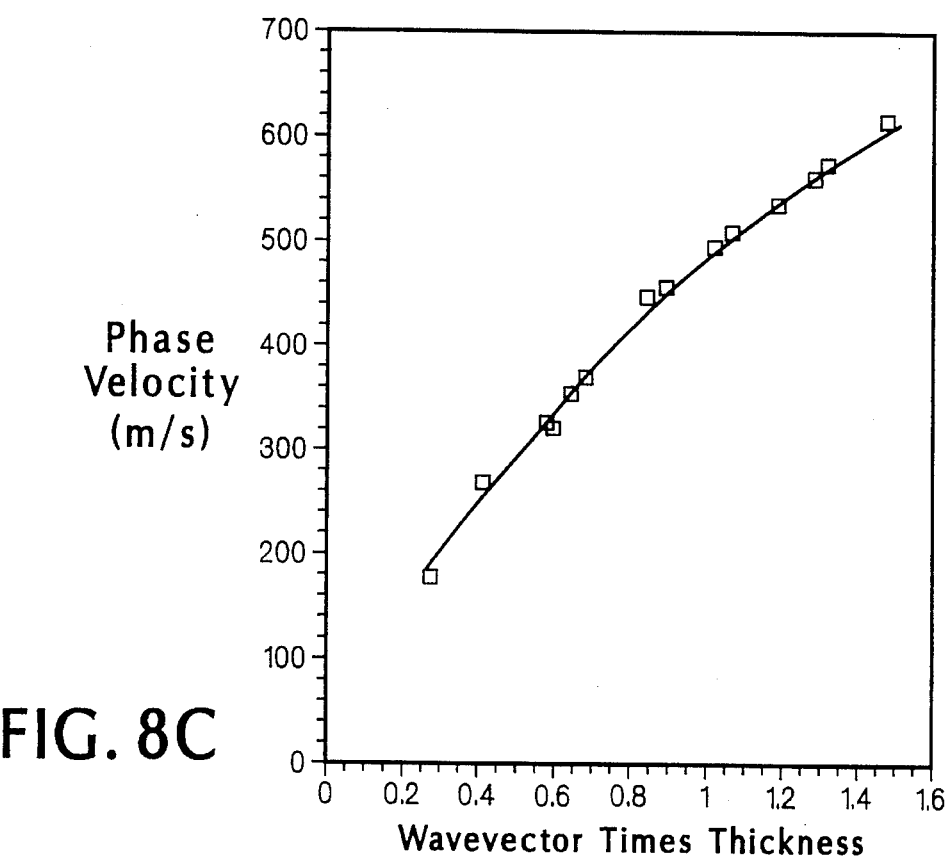
Figure 8B:
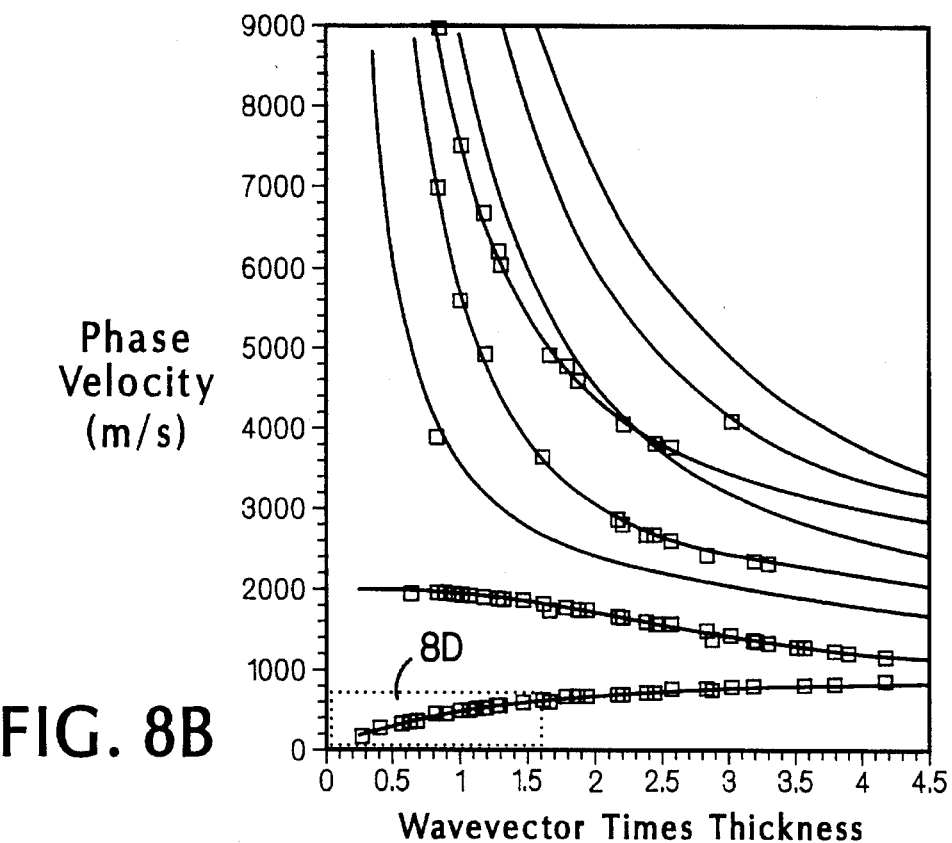
FIGS. 8B and 8D are plots showing measured phase velocities (boxes) of a 2.55-micron polyimide film compared to numerical fits (solid lines) which neglect the effects of residual stress.
Figure 8D:
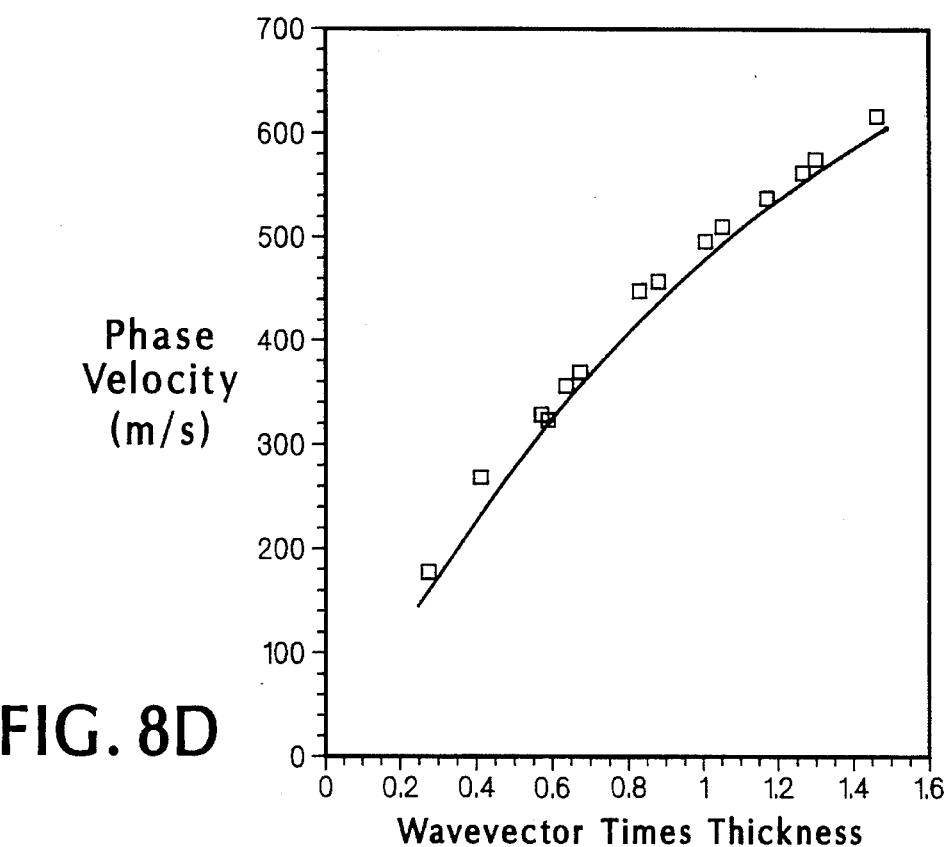

With reference now to FIGS. 8A–8D, the measured dispersion of the 2.55-micron sample is fit using models with (FIGS. 8A and 8C) and without (FIGS. 8B and 8D) the effects of residual stress. FIG. 8C shows the measured dispersion of the lowest-order mode for small, dimensionless thicknesses and best-fit calculations when the stress is included as a fitting parameter; FIG. 8D shows the fit for this mode when stress is not included. It is clear from these figures that without including the effects of residual stress, the best-fit calculations systematically miss the measured dispersion.

Figure 9B:
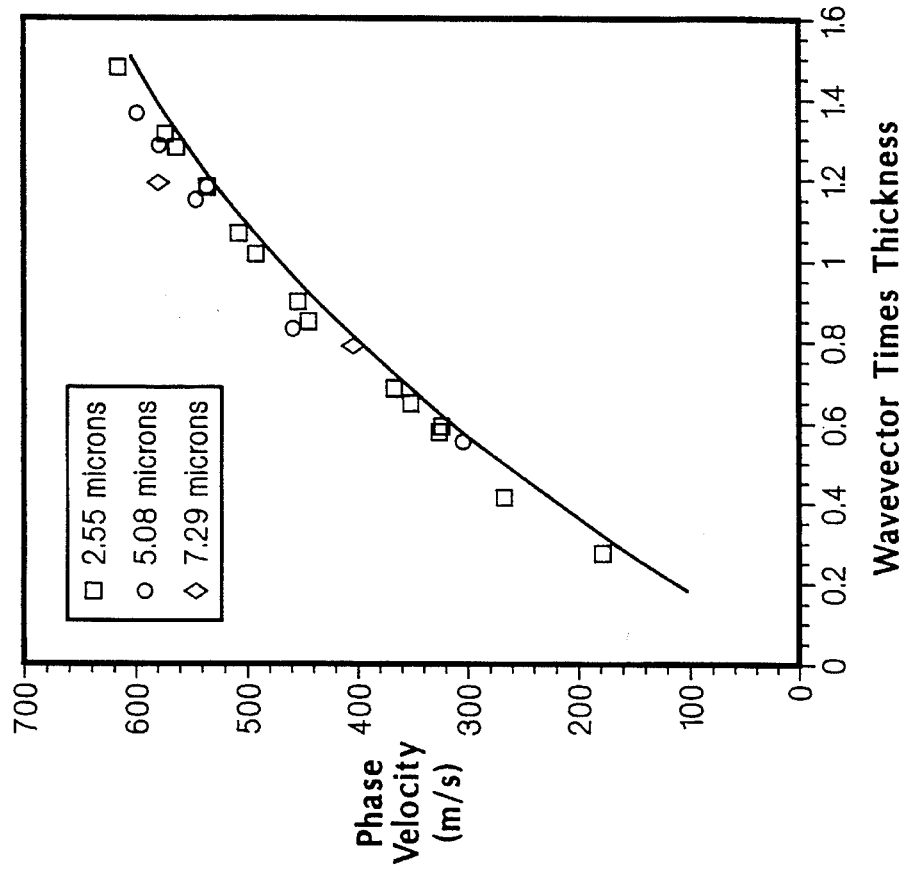
FIGS. 9A and 9B are plots of the lowest-order mode phase velocity measured in 2.55, 5.08, and 7.29-micron films compared to numerical fits which, respectively, include and neglect the effects of residual stress.
Figure 9A:
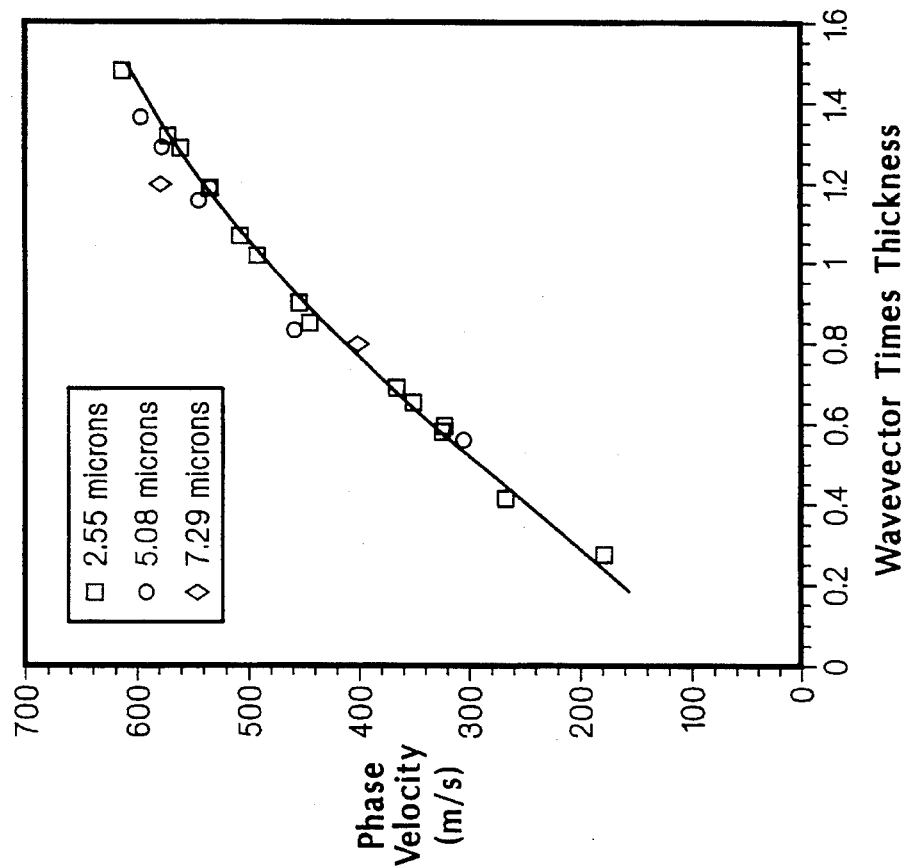

With reference now to FIGS. 9A and 9B, the dispersion of the lowest-order mode from each of the three films are compared with best-fit calculations which include (FIG. 9A) and neglect (FIG. 9B) the effects of residual stress. As with the 2.55-micron sample, the 5.08 and 7.29 micron films show a systematic deviations between the best-fit calculations and the measured dispersion when the residual stress is not included; these deviations disappear when the residual stress is included as a fitting parameter. Most data points in the figures correspond to the 2.55-micron film (i.e., the boxes) as it is relatively easy to achieve the thin film regime with this sample. Values of best-fit parameters for fits shown in FIGS. 8A–8D and 9A–9B are summarized in Table 1, below.

For more accurate measurement of the residual stresses in the 5.08 and 7.29-micron samples, two parallel cuts were made in the unsupported films. In this way, an in-plane anisotropy in the stress is induced which can easily be quantified by using ISTS to excite and monitor waveguide modes propagating parallel and perpendicular to the cuts. This method, in general, allows determination of the residual stress in the thicker films, and additionally enables the accuracy of the residual stress values determined in thinner films to be checked.

Figure 10A:
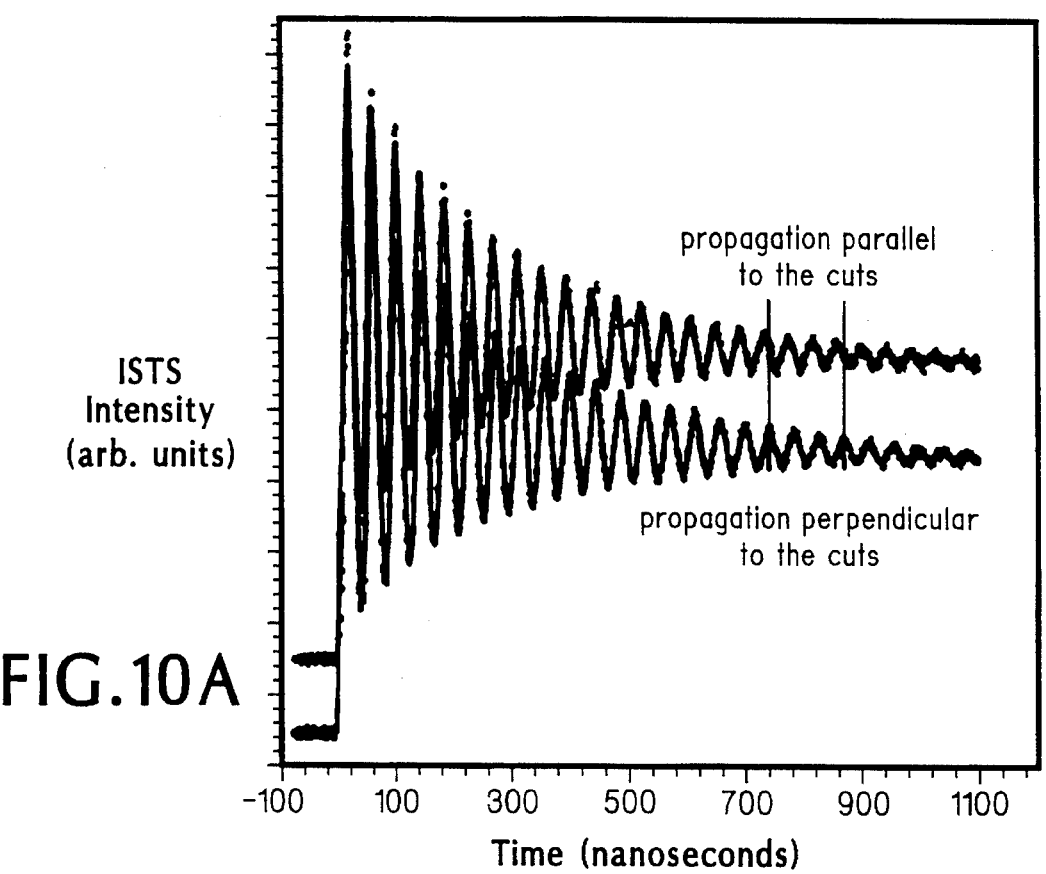
FIGS. 10A and 10B are, respectively, the ISTS response and corresponding power spectra of the lowest-order mode propagating in directions parallel and perpendicular to cuts in the 7.29-micron film.
Figure 10B:
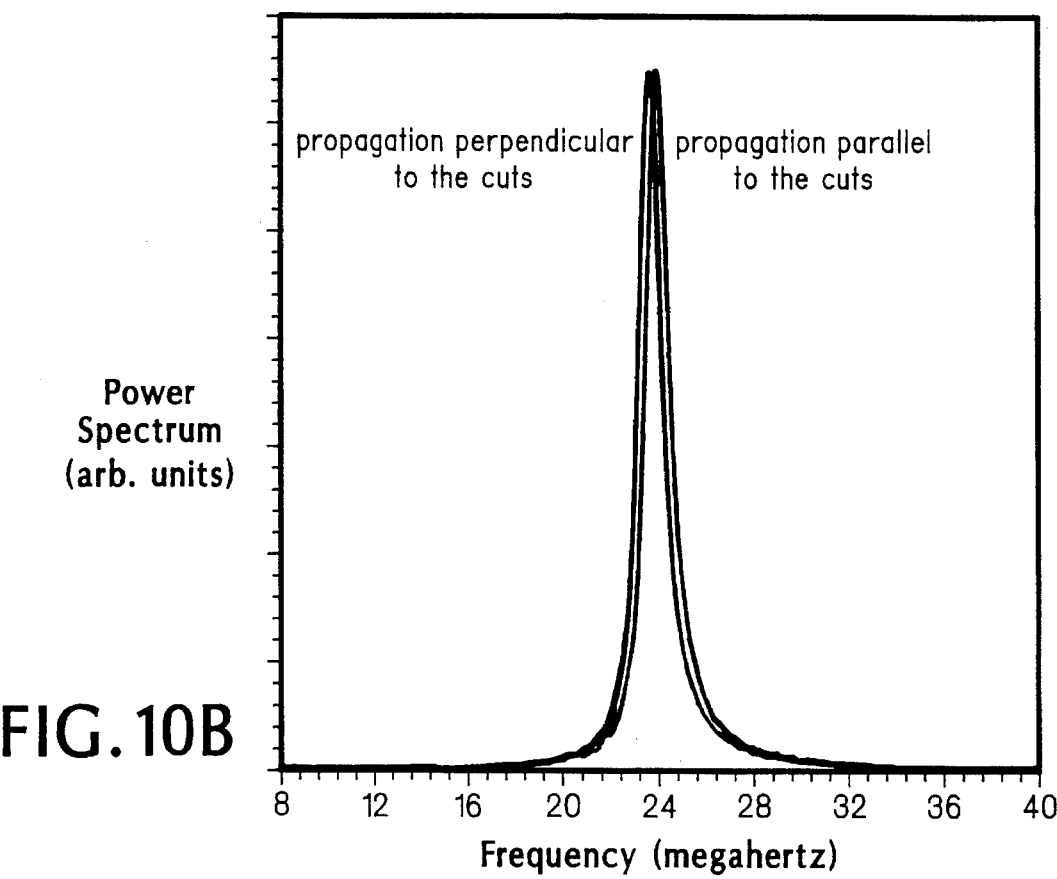

With reference now to FIG. 10A, the ISTS response and best-fit simulations of the 7.29-micron sample indicates the difference in mode propagation in directions parallel and perpendicular to the cuts. The power spectra of the two time-domain plots are shown in FIG. 10B. As expected, for a given wavelength, the frequency of the modes propagating parallel to the cuts is consistently higher than that of modes propagating perpendicular to the cuts. This frequency shift, which is measured to be 1.3% for the data shown in the figures, is due solely to the induced anisotropy in the residual stress.

Figure 11:
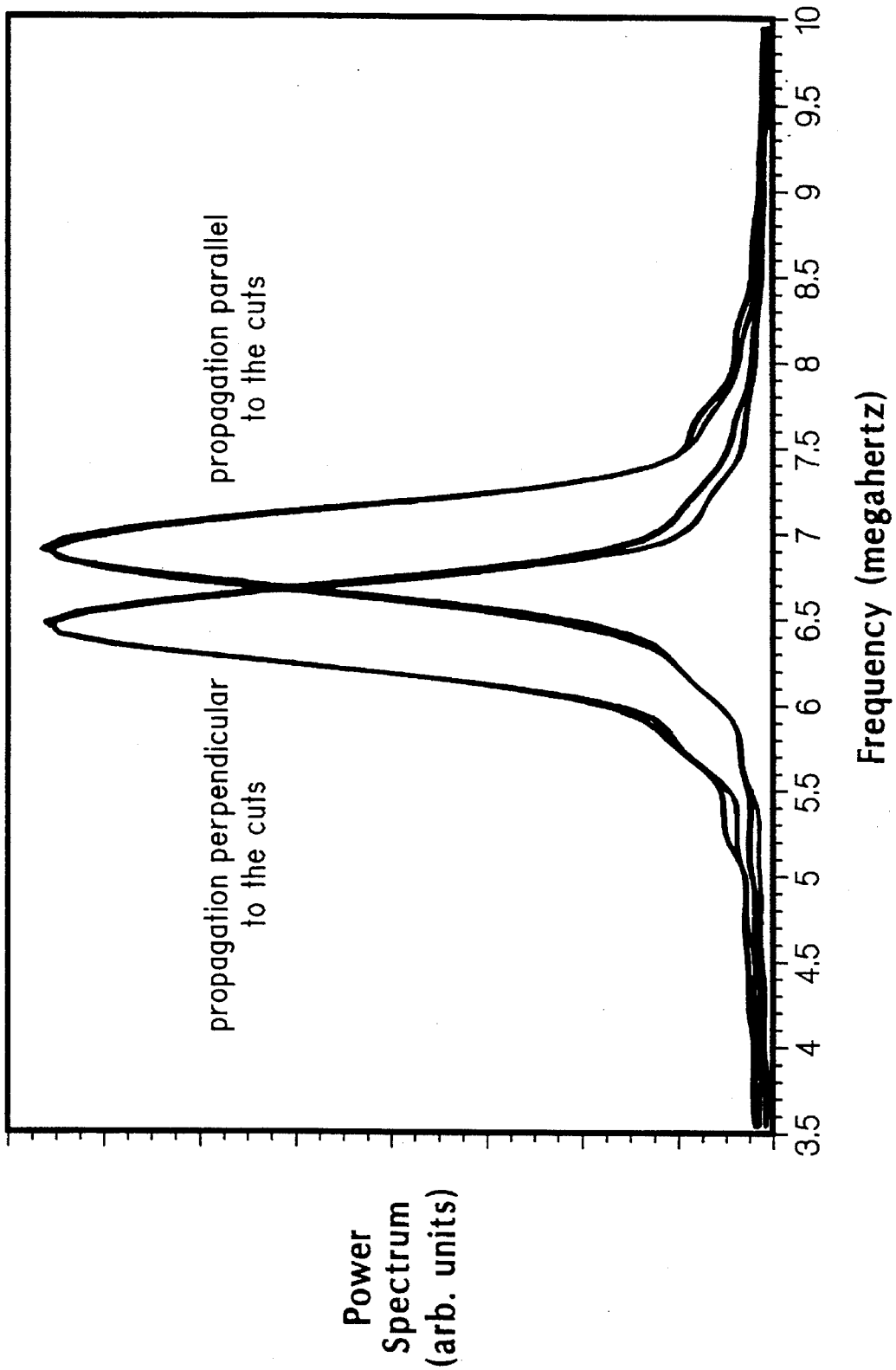
FIG. 11 is the power spectra of the lowest order Lamb mode propagating in directions parallel and perpendicular to the cuts in the 2.55-micron polyimide sample.
Figure 12D:
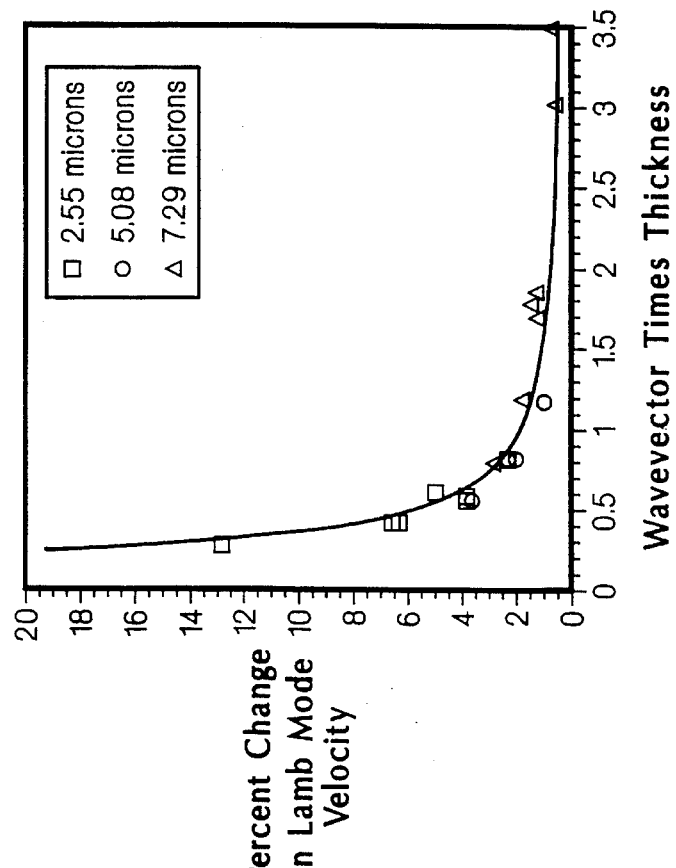
FIGS. 12A–12C are plots of the measured (symbols) and best-fit calculated (solid lines) stress-induced fractional velocity changes in, respectively, the 2.55, 5.08, and 7.29-micron samples; and, FIG. 12D is a plot showing the combined data of FIGS. 12A–12C.
Figure 12C:
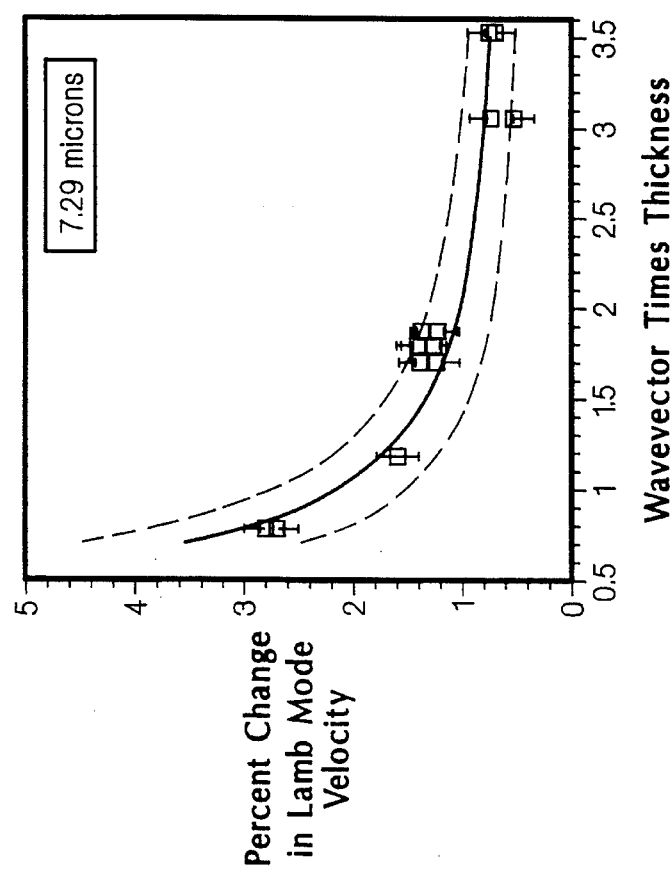

With reference now to FIG. 11, as the effective film thickness decreases, the magnitude of the frequency shift correspondingly increases. The power spectra shown in the figure is for the parallel and perpendicular-propagating modes measured in the 2.55-micron sample. An unmistakable and consistent frequency shift of 6.4% is observed. The residual stress can be determined from the magnitude of the frequency shift. This is done by first determining the elastic properties of the film using the methods described above. Using these values, the frequency shifts were fit, allowing only the residual stress to vary; this allowed exclusive determination of the residual stress.

With reference now to FIGS. 12A–12D, Lamb mode velocity change is plotted as a function of the wavevector/thickness product for 2.55, 5.08, and 7.29-micron samples cut prior to measurement. As described above, in order to directly compare the residual stresses in these specially fabricated samples to those of unmodified samples, Poisson's ratio and the measured value of uniaxial stress were used, i.e., the stress in the unmodified film is equal to the stress in the region between the cuts in the modified film divided by one minus the Poisson ratio for polyimide. Stress values were determined by the best fits (shown in the figures as the solid lines) to the data. These results, shown in Table II below, indicate that within experimental uncertainties, there is no variation of residual stress with thickness. In addition, the values of residual stresses of all samples determined using the cut method are within uncertainties of the values of the unmodified 2.55-micron film determined

TABLE 1

Stresses and Velocities Measured in Polyimide Films

| Thickness (microns) | Residual Stress (MPa) | In-plane Sheer Velocity (m/s) | Out-of-plane Sheer Velocity (m/s) | In-plane Longitudinal Velocity (m/s) | Out-of-plane Longitudinal Velocity (m/s) |
|---|---|---|---|---|---|
| 2.55 | 16 +/− 4 | 1270 +/− 30 | 930 +/− 30 | 2680 +/− 100 | 2200 +/− 80 |
| 5.08 | — | 1240 +/− 30 | 950 +/− 30 | 2590 +/− 100 | 2280 +/− 90 |
| 7.29 | — | 1175 +/− 30 | 950 +/− 30 | 2640 +/− 100 | 2240 +/− 80 |
| all three samples | 19 +/− 4 | 1260 +/− 30 | 950 +/− 30 | 2650 +/− 100 | 2200 +/− 80 | non-destructively by fitting the Lamb mode dispersion. Moreover, as demonstrated in FIG. 11, the results indicate that the percent change in Lamb mode phase velocity increases as the wavevector/thickness product decreases.

TABLE 2

Residual Stresses Measured in Modified and Un-modified Polyimide Films

| Thickness (microns) | Residual Stress (MPa) |
|---|---|
| 2.55 | 12 +/− 3 |
| 5.08 | 10 +/− 3 |
| 7.29 | 14 +/− 3 |
| all three samples | 13 +/− 3 |

All data described above neglects the presence of air that surrounds the film. Air has two distinct effects. First, with the air present, a new waveguide mode appears which is confined to the film/substrate interface. The phase velocity of this mode is not a function of the wavevector or film thickness, and takes on a value near the longitudinal velocity of ultrasound in air. More importantly, the presence of air "loads" the film, thereby introducing a slight frequency shift in the waveguide velocity of each Lamb mode. Calculations with and without the air in unstressed films indicate that for all wavevector/thickness products described herein, shifts in the lowest-order mode are smaller than 2% of the shifts induced by the residual stress. The loading effect, however, will increase as the wavevector/thickness product decreases. Thus, if ISTS measurements are made in very weakly stressed films, or at small wavevector/thickness products, air loading must be properly accounted for.

Other Embodiments

Other embodiments are within the scope of the invention. For example, light sources other than Nd:YAG lasers may be used to optically excite the film. Suitable lasers include, among others, Nd:YLF, ion (e.g., argon and krypton), Ti:Sapphire, diode, $CO_2$, holmium, excimer, dye, and metal-vapor lasers. Typically, these lasers are electro-optically or acousto-optically modulated (using, e.g., mode-locking and Q-switching devices known in the art) to produce suitable energies (i.e., between 0.1 and 5 microjoules/pulse) and pulse durations (i.e., less than about 1 ns). As before, if the fundamental frequency of the light source is lower than the absorption frequency of the film, the light may be passed through a non-linear optical media to generate light at a higher energy. If the wavelengths of the two excitation pulses are such that the pulses are attenuated by the beam-splitting optics, the order of the harmonic generation and beam splitting may be reversed, i.e., two pulses of the fundamental frequency are first generated, and then each pulse is independently passed through a non-linear optical device (or devices) to increase the frequency. In addition, the repetition rate of the pulses must be high enough to allow suitable data averaging, but low enough to allow the thermal properties of the film to recover between laser shots. Preferably, the repetition rate is between 1 and 2000 Hz, with the rate being adjusted for measurement of different types of films. For films which easily damage, it may be preferable to reduce the repetition rate of the excitation laser; a reduction in the number of excitation pulses reduces the number of heating cycles which can potentially damage thin, fragile films.

Similarly, light sources other than cw argon ion lasers may be used as the probe laser. Alternative lasers include diode and krypton ion lasers. Alternatively, a pulsed laser producing a pulse duration greater than about 500 ns may be used as the probe laser. Pulsed light sources which may be used to generate the probe beam include Q-switched Nd:YAG, Nd:YLF, Ti:Sapphire, diode, $CO_2$, holmium, excimer, dye, and metal-vapor lasers.

For thicker films or for films with much smaller residual stresses, the optical arrangement may be modified to allow for measurements at smaller wavevectors. The smallest accessible wavevector is currently determined by the angular deflection of the diffracted probe beam. For wavevectors that are very small, this deflection is not large enough to allow for spatial separation of diffracted signal from undiffracted probe light. This angular deflection can be increased for a given excitation wavevector using probe wavelengths longer than those which are currently used (i.e., 514 nm). With readily available infra-red light sources for the probe, such as $CO_2$ lasers, it is straightforward to reach wavelengths more than ten times the minimum currently practically achievable. This extension makes the ISTS technique useful for non-destructive stress measurements in thicker materials and in materials with smaller stresses. Such a modification also significantly increases the sensitivity of the technique, as it will make accessible the wavevector-thickness regime where the phase velocity of the lowest order mode is totally determined by the residual stress state, and where this phase velocity is independent of the film thickness and acoustic wavelength.

Still other embodiments are within the scope of the following claims.

```
/*
    fitting function for unsupported stressed anisotropic plate
*/

/*last modified 9/12/93*/

/*fitting a isotropic test data file works on 9/12/93*/

/*
    x[0] is the kh value
    x[1] is the mode number
    p[0] is the out-of-plane shear velocity in m/s
    p[1] is the in-plane shear velocity in m/s
    p[2] is the out-of-plane longitudinal velocity in m/s
    p[3] is the in-plane longitudinal velocity in m/s
    p[4] is the residual stress divided by the density

*/ include "matrix.h"
include "math.h"
#include "stdio.h"
#include "complex.h"

#define N 6
define LARGE 1e40 define SMALL .01
define BIG 100
#define NUMPARAMS 4
#define NEAR 0.001
#define RTRATIO 0.7
#define BISINT 10.0
define VACC 1.0e-6 double genlamvel(y,q)
```

```
vector y;
vector q;

{ int index, nroots;
  int getvs();
  vector vs, r;
  double retval;

index=y[1];
  r=vdim(5);
  vs=vdim(index+1);
  if(!vs){
    fprintf(stderr,"no memory in vs\n");
    exit(-1);
  }

/*converting input velocities into scaled moduli (i.e. moduli divided by
the density*/ r[0]=q[0]*q[0];
  r[1]=q[3]*q[3];
  r[3]=q[2]*q[2];
  r[2]=-2.0*q[1]*q[1]+r[3];
  r[4]=q[4];

nroots=getvs(y[0],r,vs,BISINT,VACC,index+1);
  vfree(r);
  if(nroots!=(index+1)){
    printf("trouble with root finding in the fitting routine\n");
    printf("the kh value is %le and the index is %le\n",y[0],y[1]);
    vfree(vs);
    return(1000000.0);
  }
  else{
    retval=vs[index];
    vfree(vs);
    return(retval);
  }
```

}

```
double funceval(x,p)
vector x,p;

{
  int i,j;
  comatrix modematrix, matrcalc();
  double deterval;
  complex tempor, comdeter();

modematrix = matrcalc(x[0],x[1],p[0],p[1],p[2],p[3],p[4]);
  tempor = comdeter(modematrix,4);
  comfree(modematrix, 4, 4);

if(fabs(tempor.im) > fabs(tempor.re))
    deterval = tempor.im;
  else
    deterval = tempor.re;

/* determinant should be either completely imaginary or completely real
  */
  /* if(fabs(tempor.im)/fabs(tempor.re)>SMALL &&
       fabs(tempor.im)/fabs(tempor.re)<BIG){
    fprintf(stderr, "there are real and imaginary parts to determinant\n");
    fprintf(stderr, "\nreal = %le, imag = %le\n", tempor.re, tempor.im);
    for (i=0; i<2; i++)
      fprintf(stderr, "x[%d] = %le\t",i, x[i]);

for (i=0; i<6; i++)
      fprintf(stderr, "p[%d] = %le\t",i, p[i]);

}
  */
  return (deterval);
}
/*returns the matrix whose determinant is to be set to zero*/
```

```
comatrix matrcalc(v,kh,c44,c33,c23,c22,stress)
double v, kh;
double c44, c33, c23, c22, stress;
{ comatrix b;
  covector alpha;
  covector bvect;
  covector exppb, expmb;
  covector evalalpha2(), evalb();
  double smodv;
  int i;

b=comdim(4,4);
  exppb=covdim(4);
  expmb=covdim(4);
  if(!expmb){
    fprintf(stderr,"no memory in matrcalc\n");
    exit(-1);
  } smodv=sqrt(v*v-stress);

bvect=evalb(c44,c33,c23,c22,smodv);
  alpha=evalalpha2(bvect,c44,c33,c23,smodv);

for(i=0;i<4;i++){
    exppb[i]=Cexp(Cmul(Complex(0.0,kh/2.0),bvect[i]));
    expmb[i]=Cexp(Cmul(Complex(0.0,-1.0*kh),bvect[i]));
  } for(i=0;i<4;i++){
    b[0][i]=Cadd(RCmul(c23,alpha[i]),RCmul(c33,bvect[i]));
    b[0][i]=Cmul(b[0][i],exppb[i]);
  } for(i=0;i<4;i++){
    b[1][i]=Cmul(b[0][i],expmb[i]);
  }
```

```
  for(i=0;i<4;i++){
   b[2][i]=Cadd(Cmul(bvect[i],alpha[i]),Complex(1.0,0.0));
   b[2][i]=Cmul(b[2][i],RCmul(c44,exppb[i]));
  } for(i=0;i<4;i++){
   b[3][i]=Cmul(b[2][i],expmb[i]);
  } covfree(bvect);
  covfree(exppb);
  covfree(expmb);
  covfree(alpha);

return (b);

} covector evalb(c44,c33,c23,c22,v)
double c44, c33, c23, c22, v;
{
  int i;
  double a, b, c;
  covector ret;
  complex b1sqrd, b2sqrd;

ret=covdim(4);
  if(!ret){
    fprintf(stderr,"no memory in evalb\n");
    exit(-1);
  } a=-1.0*c44*c33;

b=(c23+c44)*(c23+c44)+v*v*c44-c44*c44+v*v*c33-c22*c33;

c=-1.0*(c22-v*v)*(c44-v*v);
```

```
  b1sqrd=Cadd(Complex(-b,0.0),Csqrt(Complex(b*b-4.0*a*c,0.0)));

b1sqrd=Cdiv(b1sqrd,Complex(2.0*a,0.0));

b2sqrd=Csub(Complex(-b,0.0),Csqrt(Complex(b*b-4.0*a*c,0.0)));

b2sqrd=Cdiv(b2sqrd,Complex(2.0*a,0.0));

ret[0]=Csqrt(b1sqrd);
  ret[1]=Cmul(Complex(-1.0,0.0),Csqrt(b1sqrd));
  ret[2]=Csqrt(b2sqrd);
  ret[3]=Cmul(Complex(-1.0,0.0),Csqrt(b2sqrd));

return(ret);

} covector evalalpha2(b,c44,c33,c23,v)
covector b;
double c44, c33, c23, v;
{
  int i;
  covector rt;
  complex tempnum, tempdenom;

rt=covdim(4);
  if(!rt){
    fprintf(stderr,"no memory in evalalpha\n");
    exit(-1);
  } for(i=0;i<4;i++){
    tempnum=Csub(Complex(v*v-c44,0.0),RCmul(c33,Cmul(b[i],b[i])));
    tempdenom=RCmul(c23+c44,b[i]);
    rt[i]=Cdiv(tempnum,tempdenom);
  } return (rt);

}
```

```
/*
    finds the velocity values that solve determinant eq. consistent
with kh and p values. Uses interval bisint to step through the possible
velocity values using bisection routine. bisint must be smaller than
closest velocity spacing. vacc is accuracy for bisection routine. At
finish, vs will contain velocity values and the number of values will
be returned.
*/ getvs(kh, params, vels, bisint, vacc, maxroots)
double kh, bisint, vacc;
vector params, vels;
int maxroots;
{
  double c2, c1, lastroot=0.0, root, frtbis(), maxv;
  double vtr, vlg;
  int nroots=0, done=0;

vtr=sqrt(params[0]+params[4]);
  vlg=sqrt(params[3]+params[4]);

maxv=10000.0;
  c1=sqrt(params[4])+1.0;

c2 = c1 + bisint;
  while(!done){
    /* watch out for solution near vlg */
    if((vlg<c2+NEAR) && (vlg>c1-NEAR)){
      if( ((root=frtbis(kh,params,c1,vlg-NEAR,vacc))>SMALL)
          && fabs(root-lastroot)>vacc ){
/*      fprintf(stderr, "got root %le in vlg loop\n", root);*/
        vels[nroots] = root;
/*      printf("got a root and the value is %le\n",root);*/
        lastroot = root;
        nroots++;
        if(nroots == maxroots)
          done = 1;
      }
      c1 = vlg + NEAR;
```

```
        c2 += NEAR;
      }
      /* watch out for solution near vtr */
      if((vtr<c2+NEAR) && (vtr>c1-NEAR)){
        if( (((root=frtbis(kh,params,c1,vtr-NEAR,vacc))>SMALL)
            && fabs(root-lastroot)>vacc) && !done){
/*        fprintf(stderr, "got root %le in vtr loop\n", root);*/
          vels[nroots] = root;
/*        printf("got a root and the value is %le\n",root);*/
          lastroot = root;
          nroots++;
          if(nroots == maxroots)
            done = 1;
        }
        c1 = vtr + NEAR;
        c2 += NEAR;
      } if( (((root=frtbis(kh,params,c1,c2,vacc))>SMALL)
          && fabs(root-lastroot)>vacc) && !done ){
        vels[nroots] = root;
/*      printf("got a root and the value is %le\n",root);*/
        lastroot = root;
        nroots++;
        if(nroots == maxroots)
          done = 1;
      } c1 = c2;
      c2 += bisint;
      if (c2 > maxv)
        done = 1;
    }
    return nroots;
}

/* keeps all roots */ getallvs(kh, params, vels, bisint, vacc, maxroots)
```

```
double kh, bisint, vacc;
vector params, vels;
int maxroots;
{
  double c2, c1, lastroot=0.0, root, frtbis(), maxv;
  int nroots=0, done=0;

maxv=10000.0;
  c1=0.1;

c2 = c1 + bisint;
  while(!done){
    if( ((root=frtbis(kh,params,c1,c2,vacc))>SMALL)
        && fabs(root-lastroot)>vacc ){
      vels[nroots] = root;
      lastroot = root;
      nroots++;
      if(nroots == maxroots)
        done = 1;
    } c1 = c2;
    c2 += bisint;
    if (c2 > maxv)
      done = 1;
  }
  return nroots;
} define JMAX 40 double frtbis(kh,pa,v1,v2,vacc)
double kh, v1,v2,vacc;
vector pa;

{
        int j;
```

```
    double dv, f, fmid, vmid, rtb, funceval();
    vector z;

z=vdim(2);

if(!z){
      fprintf(stderr,"no memory in frtbis\n");
      exit(-1);
    } z[1] = kh;

z[0] = v1;
    f=funceval(z,pa);

z[0] = v2;
    fmid=funceval(z,pa);

if (f*fmid >= 0.0) return (0.0);

rtb = f < 0.0 ? (dv=v2-v1,v1) : (dv=v1-v2,v2);
    for (j=1;j<=JMAX;j++) {
         vmid = rtb+(dv *= 0.5);
         z[0] = vmid;
         fmid=funceval(z,pa);
         if (fmid <= 0.0) rtb=vmid;
         if (fabs(dv) < vacc || fmid == 0.0){
            vfree(z);
            return rtb;}
    }
    fprintf(stderr, "Too many bisections in FRTBIS\n");
    vfree(z);
    return (0.0);
}
undef JMAX /* -h<y<0 is film, y>0 is substrate */
```

```
getdispl(potents, vs, y, clgf, ctrf, k, uy, uz, numvs)
comatrix potents;
vector vs;
covector uy, uz;
double clgf, ctrf, k,y;
{
  int i;
  complex ik;
  covector a, b, c, d;
  covector o, p;

a = covdim(numvs);
  b = covdim(numvs);
  c = covdim(numvs);
  d = covdim(numvs);
  o = covdim(numvs);
  p = covdim(numvs);
  if(!p){
    fprintf(stderr,"no memory\n");
    exit(-1);
  } ik = Complex(0.0,k);
  if (y<0.0){
    for(i=0; i<numvs; i++){
      o[i] = Csqrt(Complex(1 - vs[i]*vs[i]/(clgf*clgf),0));
      p[i] = Csqrt(Complex(1 - vs[i]*vs[i]/(ctrf*ctrf),0));
      a[i] = Cmul(potents[i][0],Cexp(RCmul(k*y,o[i])));
      b[i] = Cmul(potents[i][1],Cexp(RCmul(-k*y,o[i])));
      c[i] = Cmul(potents[i][2],Cexp(RCmul(k*y,p[i])));
      d[i] = Cmul(potents[i][3],Cexp(RCmul(-k*y,p[i])));
    }
  }
  else{
    for(i=0; i<numvs; i++){
      o[i] = Csqrt(Complex(1 - vs[i]*vs[i]/(clgf*clgf),0));
      p[i] = Csqrt(Complex(1 - vs[i]*vs[i]/(ctrf*ctrf),0));
      a[i].re = 0.0;
      a[i].im = 0.0;
```

```
      b[i] = Cmul(potents[i][4],Cexp(RCmul(-k*y,o[i])));
      c[i].re = 0.0;
      c[i].im = 0.0;
      d[i] = Cmul(potents[i][5],Cexp(RCmul(-k*y,p[i])));
    }
  } for(i=0; i<numvs; i++){
    uy[i] = Cadd(Cmul(RCmul(k,o[i]),Csub(a[i],b[i])),
              Cmul(ik,Cadd(c[i],d[i])));
    uz[i] = Cadd(Cmul(RCmul(k,p[i]),Csub(d[i],c[i])),
              Cmul(ik,Cadd(a[i],b[i])));
  }
  cvfree(a);
  cvfree(b);
  cvfree(c);
  cvfree(d);
  cvfree(o);
  cvfree(p);

} getlgtrdispl(potents, vs, y, clgf, ctrf, k, uyl, uzl, uyt, uzt, numvs)
comatrix potents;
vector vs;
covector uyl, uzl, uyt, uzt;
double clgf, ctrf, k,y;
{
  int i;
  complex ik;
  covector a, b, c, d;
  covector o, p;

a = covdim(numvs);
  b = covdim(numvs);
  c = covdim(numvs);
  d = covdim(numvs);
  o = covdim(numvs);
  p = covdim(numvs);
```

```
if(!p){
  fprintf(stderr,"no memory\n");
  exit(-1);
} ik = Complex(0.0,k);
if (y>0.0){
  for(i=0; i<numvs; i++){
    o[i] = Csqrt(Complex(1 - vs[i]*vs[i]/(clgf*clgf),0));
    p[i] = Csqrt(Complex(1 - vs[i]*vs[i]/(ctrf*ctrf),0));
    a[i] = Cmul(potents[i][0],Cexp(RCmul(-k*y,o[i])));
    b[i] = Cmul(potents[i][1],Cexp(RCmul(k*y,o[i])));
    c[i] = Cmul(potents[i][2],Cexp(RCmul(-k*y,p[i])));
    d[i] = Cmul(potents[i][3],Cexp(RCmul(k*y,p[i])));
  }
}
else{
  for(i=0; i<numvs; i++){
    o[i] = Csqrt(Complex(1 - vs[i]*vs[i]/(clgf*clgf),0));
    p[i] = Csqrt(Complex(1 - vs[i]*vs[i]/(ctrf*ctrf),0));
    a[i].re = 0.0;
    a[i].im = 0.0;
    b[i] = Cmul(potents[i][4],Cexp(RCmul(k*y,o[i])));
    c[i].re = 0.0;
    c[i].im = 0.0;
    d[i] = Cmul(potents[i][5],Cexp(RCmul(k*y,p[i])));
  }
} for(i=0; i<numvs; i++){
  uyl[i] = Cmul(RCmul(k,o[i]),Csub(a[i],b[i]));
  uzl[i] = Cmul(ik,Cadd(a[i],b[i]));
  uyt[i] = Cmul(ik,Cadd(c[i],d[i]));
  uzt[i] = Cmul(RCmul(k,p[i]),Csub(d[i],c[i]));
}
cvfree(a);
cvfree(b);
cvfree(c);
cvfree(d);
cvfree(o);
```

```
    cvfree(p);
}
```

```
/*
   fitting function for unsupported anisotropic plate
*/

/*last modified 8/29/93*/

/*matches the isotropic model on 8/29/93*/

/*
   x[0] is the kh value
   x[1] is the mode number
   p[0] is the out-of-plane shear velocity in m/s
   p[1] is the in-plane shear velocity in m/s
   p[2] is the out-of-plane longitudinal velocity in m/s
   p[3] is the in-plane longitudinal velocity in m/s

*/ include "matrix.h"
include "math.h"
#include "stdio.h"
#include "/marla/john/complex/complex.h"

#define N 6
define LARGE 1e40 define SMALL .01
define BIG 100
#define NUMPARAMS 4
#define NEAR 0.001
#define RTRATIO 0.7
#define BISINT 10.0
define VACC 1.0e-6 double genlamvel(y,q)
```

```
vector y;
vector q;

{ int index, nroots;
  int getvs();
  vector vs, r;
  double retval;
  double alpha, bvect, b;

index=y[1];
  r=vdim(4);
  vs=vdim(index+1);
  if(!vs){
    fprintf(stderr,"no memory in vs\n");
    exit(-1);
  }

/*converting input velocities into scaled moduli
          (i.e. moduli divided by the density*/ r[0]=q[0]*q[0];
  r[1]=q[3]*q[3];
  r[3]=q[2]*q[2];
  r[2]=-2.0*q[1]*q[1]+r[3];

nroots=getvs(y[0],r,vs,BISINT,VACC,index+1);
  vfree(r);

alpha=0.0;
  bvect=0.0;
  b=0.0;

if(nroots!=(index+1)){
    printf("trouble with root finding in the fitting routine\n");
    vfree(vs);
```

```
    return(1000000.0);
  }
  else{
    retval=vs[index];
    vfree(vs);
    return(retval);
  }
} double funceval(x,p)
vector x,p;

{
  int i,j;
  comatrix modematrix, matrcalc();
  double deterval;
  complex tempor, comdeter();

modematrix = matrcalc(x[0],x[1],p[0],p[1],p[2],p[3]);
  tempor = comdeter(modematrix,NUMPARAMS);
  comfree(modematrix, NUMPARAMS, NUMPARAMS);

if(fabs(tempor.im) > fabs(tempor.re))
    deterval = tempor.im;
  else
    deterval = tempor.re;

/* determinant should be either completely imaginary
        or completely real */
  if(fabs(tempor.im)/fabs(tempor.re)>SMALL &&
          fabs(tempor.im)/fabs(tempor.re)<BIG){
    fprintf(stderr, "there are real and imaginary parts to determinant\n");
    fprintf(stderr, "\nreal = %le, imag = %le\n", tempor.re, tempor.im);
    for (i=0; i<2; i++)
      fprintf(stderr, "x[%d] = %le\t",i, x[i]);
/*
    for (i=0; i<6; i++)
```

```
            fprintf(stderr, "p[%d] = %le\t",i, p[i]);
*/
  } return (deterval);
}
/*returns the matrix whose determinant is to be set to zero*/ comatrix matrcalc(v,kh,c44,c33,c23,c22)
double v, kh;
double c44, c33, c23, c22;
{ comatrix b;
  covector alpha;
  covector bvect;
  covector exppb, expmb;
  covector evalalpha2(), evalb();
  int i;

b=comdim(4,4);
  exppb=covdim(4);
  expmb=covdim(4);
  if(!expmb){
    fprintf(stderr,"no memory\n");
    exit(-1);
  } bvect=evalb(c44,c33,c23,c22,v);
  alpha=evalalpha2(bvect,c44,c33,c23,v);

for(i=0;i<4;i++){
    exppb[i]=Cexp(Cmul(Complex(0.0,kh/2.0),bvect[i]));
    expmb[i]=Cexp(Cmul(Complex(0.0,-1.0*kh),bvect[i]));
  } for(i=0;i<4;i++){
    b[0][i]=Cadd(RCmul(c23,alpha[i]),RCmul(c33,bvect[i]));
    b[0][i]=Cmul(b[0][i],exppb[i]);
```

```
    } for(i=0;i<4;i++){
    b[1][i]=Cmul(b[0][i],expmb[i]);
   } for(i=0;i<4;i++){
    b[2][i]=Cadd(Cmul(bvect[i],alpha[i]),Complex(1.0,0.0));
    b[2][i]=Cmul(b[2][i],RCmul(c44,exppb[i]));
   } for(i=0;i<4;i++){
    b[3][i]=Cmul(b[2][i],expmb[i]);
   } covfree(bvect);
   covfree(exppb);
   covfree(expmb);
   covfree(alpha);

return (b);

} covector evalb(c44,c33,c23,c22,v)
double c44, c33, c23, c22, v;
{ int i;
 double a, b, c;
 covector retval;
 complex b1sqrd, b2sqrd;

retval=covdim(4);
 if(!retval){
   fprintf(stderr,"no memory in evalb\n");
   exit(-1);
 }
```

```
    a=-1.0*c44*c33;

b=(c23+c44)*(c23+c44)+v*v*c44-c44*c44+v*v*c33-c22*c33;

c=-1.0*(c22-v*v)*(c44-v*v);

b1sqrd=Cadd(Complex(-b,0.0),Csqrt(Complex(b*b-4.0*a*c,0.0)));

b1sqrd=Cdiv(b1sqrd,Complex(2.0*a,0.0));

b2sqrd=Csub(Complex(-b,0.0),Csqrt(Complex(b*b-4.0*a*c,0.0)));

b2sqrd=Cdiv(b2sqrd,Complex(2.0*a,0.0));

retval[0]=Csqrt(b1sqrd);
    retval[1]=Cmul(Complex(-1.0,0),retval[0]);
    retval[2]=Csqrt(b2sqrd);
    retval[3]=Cmul(Complex(-1.0,0.0),retval[2]);

return(retval);

} covector evalalpha2(b,c44,c33,c23,v)
covector b;
double c44, c33, c23, v;
{
  int i;
  covector retval;
  complex tempnum, tempdenom;

retval=covdim(4);
  if(!retval){
    fprintf(stderr,"no memory in evalalpha\n");
    exit(-1);
  } for(i=0;i<4;i++){
    tempnum=Csub(Complex(v*v-c44,0.0),RCmul(c33,Cmul(b[i],b[i])));
    tempdenom=RCmul(c23+c44,b[i]);
```

```
    retval[i]=Cdiv(tempnum,tempdenom);
  } return (retval);

}

/*
  finds the velocity values that solve determinant eq. consistent with kh
  and p values. Uses interval bisint to step through the possible velocity
  values using bisection routine. bisint must be smaller than closest velocity
  spacing. vacc is accuracy for bisection routine. At finish, vs will contain
  velocity values and the number of values will be returned.
*/ getvs(kh, params, vels, bisint, vacc, maxroots)
double kh, bisint, vacc;
vector params, vels;
int maxroots;
{
  double c2, c1, lastroot=0.0, root, frtbis(), maxv;
  double vtr, vlg;
  int nroots=0, done=0;

vtr=sqrt(params[0]);
  vlg=sqrt(params[3]);

maxv=10000.0;
  c1=100.1;

c2 = c1 + bisint;
  while(!done){
    /* watch out for solution near vlg */
    if((vlg<c2+NEAR) && (vlg>c1-NEAR)){
      if( ((root=frtbis(kh,params,c1,vlg-NEAR,vacc))>SMALL)
           && fabs(root-lastroot)>vacc ){
        fprintf(stderr, "got root %le in vlg loop\n", root);
        vels[nroots] = root;
/*      printf("got a root and the value is %le\n",root);*/
        lastroot = root;
```

```
      nroots++;
      if(nroots == maxroots)
        done = 1;
    }
    c1 = vlg + NEAR;
    c2 += NEAR;
  }
  /* watch out for solution near vtr */
  if((vtr<c2+NEAR) && (vtr>c1-NEAR)){
    if( (((root=frtbis(kh,params,c1,vtr-NEAR,vacc))>SMALL)
           && fabs(root-lastroot)>vacc) && !done){
      fprintf(stderr, "got root %le in vtr loop\n", root);
      vels[nroots] = root;
/*    printf("got a root and the value is %le\n",root);*/
      lastroot = root;
      nroots++;
      if(nroots == maxroots)
        done = 1;
    }
    c1 = vtr + NEAR;
    c2 += NEAR;
  } if( (((root=frtbis(kh,params,c1,c2,vacc))>SMALL)
         && fabs(root-lastroot)>vacc) && !done ){
    vels[nroots] = root;
/*    printf("got a root and the value is %le\n",root);*/
    lastroot = root;
    nroots++;
    if(nroots == maxroots)
      done = 1;
  } c1 = c2;
  c2 += bisint;
  if (c2 > maxv)
    done = 1;
 }
 return nroots;
}
```

```
/* keeps all roots */ getallvs(kh, params, vels, bisint, vacc, maxroots)
double kh, bisint, vacc;
vector params, vels;
int maxroots;
{
  double c2, c1, lastroot=0.0, root, frtbis(), maxv;
  int nroots=0, done=0;

maxv=10000.0;
  c1=0.1;

c2 = c1 + bisint;
  while(!done){
    if( ((root=frtbis(kh,params,c1,c2,vacc))>SMALL)
          && fabs(root-lastroot)>vacc ){
      vels[nroots] = root;
      lastroot = root;
      nroots++;
      if(nroots == maxroots)
        done = 1;
    } c1 = c2;
    c2 += bisint;
    if (c2 > maxv)
      done = 1;
  }
  return nroots;
} define JMAX 40 double frtbis(kh,pa,v1,v2,vacc)
```

```
double kh, v1,v2,vacc;
vector pa;

{
      int j;
      double dv, f, fmid, vmid, rtb, z[2], funceval();

if(!z){
        fprintf(stderr,"no memory in frtbis\n");
        exit(-1);
      } z[1] = kh;

z[0] = v1;
      f=funceval(z,pa);

z[0] = v2;
      fmid=funceval(z,pa);

if (f*fmid >= 0.0) return (0.0);

rtb = f < 0.0 ? (dv=v2-v1,v1) : (dv=v1-v2,v2);
      for (j=1;j<=JMAX;j++) {
            vmid = rtb+(dv *= 0.5);
            z[0] = vmid;
            fmid=funceval(z,pa);
            if (fmid==NULL){
              vfree(z);
              return(0.0);}
            if (fmid <= 0.0) rtb=vmid;
            if (fabs(dv) < vacc || fmid == 0.0){
              vfree(z);
              return rtb;}
      }
      fprintf(stderr, "Too many bisections in FRTBIS\n");
      vfree(z);
      return (0.0);
}
```

```
#undef JMAX

/* -h<y<0 is film,  y>0 is substrate */ getdispl(potents, vs, y, clgf, ctrf, k, uy, uz, numvs)
comatrix potents;
vector vs;
covector uy, uz;
double clgf, ctrf, k,y;
{
  int i;
  complex ik;
  covector a, b, c, d;
  covector o, p;

a = covdim(numvs);
  b = covdim(numvs);
  c = covdim(numvs);
  d = covdim(numvs);
  o = covdim(numvs);
  p = covdim(numvs);
  if(!p){
    fprintf(stderr,"no memory\n");
    exit(-1);
  } ik = Complex(0.0,k);
  if (y<0.0){
    for(i=0; i<numvs; i++){
      o[i] = Csqrt(Complex(1 - vs[i]*vs[i]/(clgf*clgf),0));
      p[i] = Csqrt(Complex(1 - vs[i]*vs[i]/(ctrf*ctrf),0));
      a[i] = Cmul(potents[i][0],Cexp(RCmul(k*y,o[i])));
      b[i] = Cmul(potents[i][1],Cexp(RCmul(-k*y,o[i])));
      c[i] = Cmul(potents[i][2],Cexp(RCmul(k*y,p[i])));
      d[i] = Cmul(potents[i][3],Cexp(RCmul(-k*y,p[i])));
    }
  }
  else{
```

```
    for(i=0; i<numvs; i++){
      o[i] = Csqrt(Complex(1 - vs[i]*vs[i]/(clgf*clgf),0));
      p[i] = Csqrt(Complex(1 - vs[i]*vs[i]/(ctrf*ctrf),0));
      a[i].re = 0.0;
      a[i].im = 0.0;
      b[i] = Cmul(potents[i][4],Cexp(RCmul(-k*y,o[i])));
      c[i].re = 0.0;
      c[i].im = 0.0;
      d[i] = Cmul(potents[i][5],Cexp(RCmul(-k*y,p[i])));
     }
  } for(i=0; i<numvs; i++){
    uy[i] = Cadd(Cmul(RCmul(k,o[i]),Csub(a[i],b[i]))
            ,Cmul(ik,Cadd(c[i],d[i])));
    uz[i] = Cadd(Cmul(RCmul(k,p[i]),Csub(d[i],c[i]))
            ,Cmul(ik,Cadd(a[i],b[i])));
  }
  cvfree(a);
  cvfree(b);
  cvfree(c);
  cvfree(d);
  cvfree(o);
  cvfree(p);

} getlgtrdispl(potents, vs, y, clgf, ctrf, k, uyl, uzl, uyt, uzt, numvs)
comatrix potents;
vector vs;
covector uyl, uzl, uyt, uzt;
double clgf, ctrf, k,y;
{
  int i;
  complex ik;
  covector a, b, c, d;
  covector o, p;

a = covdim(numvs);
```

```
b = covdim(numvs);
c = covdim(numvs);
d = covdim(numvs);
o = covdim(numvs);
p = covdim(numvs);
if(!p){
  fprintf(stderr,"no memory\n");
  exit(-1);
} ik = Complex(0.0,k);
if (y>0.0){
  for(i=0; i<numvs; i++){
    o[i] = Csqrt(Complex(1 - vs[i]*vs[i]/(clgf*clgf),0));
    p[i] = Csqrt(Complex(1 - vs[i]*vs[i]/(ctrf*ctrf),0));
    a[i] = Cmul(potents[i][0],Cexp(RCmul(-k*y,o[i])));
    b[i] = Cmul(potents[i][1],Cexp(RCmul(k*y,o[i])));
    c[i] = Cmul(potents[i][2],Cexp(RCmul(-k*y,p[i])));
    d[i] = Cmul(potents[i][3],Cexp(RCmul(k*y,p[i])));
  }
}
else{
  for(i=0; i<numvs; i++){
    o[i] = Csqrt(Complex(1 - vs[i]*vs[i]/(clgf*clgf),0));
    p[i] = Csqrt(Complex(1 - vs[i]*vs[i]/(ctrf*ctrf),0));
    a[i].re = 0.0;
    a[i].im = 0.0;
    b[i] = Cmul(potents[i][4],Cexp(RCmul(k*y,o[i])));
    c[i].re = 0.0;
    c[i].im = 0.0;
    d[i] = Cmul(potents[i][5],Cexp(RCmul(k*y,p[i])));
  }
} for(i=0; i<numvs; i++){
  uyl[i] = Cmul(RCmul(k,o[i]),Csub(a[i],b[i]));
  uzl[i] = Cmul(ik,Cadd(a[i],b[i]));
  uyt[i] = Cmul(ik,Cadd(c[i],d[i]));
  uzt[i] = Cmul(RCmul(k,p[i]),Csub(d[i],c[i]));
}
```

```
    cvfree(a);
    cvfree(b);
    cvfree(c);
    cvfree(d);
    cvfree(o);
    cvfree(p);

}
```

What is claimed is:

1. A method for determining the residual stress in a region of an unsupported thin film sample, said method comprising the steps of:

(a) optically exciting an unsupported region of the sample with a spatially and temporally varying optical excitation field having at least one excitation wavevector, said exciting launching counter-propagating acoustic modes along at least one excitation wavevector in the region;

(b) diffracting a portion of an optical probe field off the excited acoustic modes to generate a time-dependent signal field at the excitation wavevector;

(c) detecting the signal field to generate a time-dependent, light-induced signal;

(d) analyzing the light-induced signal to determine the frequency or phase velocity of at least one acoustic mode corresponding to at least one excitation wavevector;

(e) partially determining the dispersion of at least one mode; and, (f) comparing the determined dispersion to that calculated from a mathematical model generated using equations of motions for a stressed unsupported film system, said comparing allowing the residual stress properties of the film in the excited region to be determined.

2. The method of claim 1, wherein said probe field has a small spatial dimension compared to the excitation field, and the equations of motion for the stressed unsupported film system are substantially equivalent to $$\frac{\partial}{\partial x_i}\left(\sigma_{ik}^{(r)}\frac{\partial u_j}{\partial x_k}\right)+\frac{\partial \sigma_{ij}}{\partial x_i}=\rho\frac{\partial^2 u_j}{\partial t^2}$$

where $\sigma_{ik}^{(r)}$ is the residual stress tensor, $\rho$ is the density and $\mu$ is the displacement.

3. The method of claim 2, wherein said excitation field is cylindrically focused to form an elliptical spot having a major axis in the plane of the film.

4. The method of claim 1, further comprising the step of exciting the film in the thick film regime, or in the thick or thin film regime along higher-order modes, to exclusively determine the film's mechanical properties in the unsupported region.

5. The method of claim 4, wherein following determination of the film's mechanical properties, the film is excited in the thin film regime.

6. The method of claim 5, wherein said optical excitation field is strongly absorbed by the film.

7. The method of claim 6, wherein the unsupported film's lowest-order mode is excited, and the dispersion of the lowest-order mode is determined.

8. The method of claim 7, wherein during step (f), the determined mechanical properties of the unsupported region of the film are held fixed, and the dispersion from the thin film regime is compared to the mathematical model by varying only the residual stress value to exclusively determine the film's residual stress.

9. The method of claim 1, wherein said spatially and temporally varying optical excitation field contains a single excitation wavevector.

10. The method of claim 9, wherein prior to step (e), said method further comprises repeating steps (a)–(d) to generate at least two frequencies or phase velocities corresponding to at least two separate excitation wavevectors.

11. The method of claim 1, wherein the spatially and temporally varying optical excitation field includes multiple excitation wavevectors to excite acoustic modes at multiple wavevectors.

12. The method of claim 11, wherein the optical probe field is diffracted off each of the excited acoustic modes to generate multiple time-dependent signal fields at the excitation wavevectors.

13. The method of claim 12, wherein each time-dependent signal field is detected to generate multiple time-dependent, light-induced signals, said signals being analyzed to determine the frequencies or phase velocities of the acoustic modes corresponding to said excitation wavevectors.

14. The method of claim 13, further comprising partially determining at least one mode's dispersion following excitation with a single excitation field.

15. The method of claim 1, wherein prior to step (a), two substantially parallel cuts are made in the film to generate an increased anisotropy in the residual stress.

16. The method of claim 15, wherein the cuts are separated by a distance of between 3 and 100 times the reciprocal of at least one of the excitation wavevectors.

17. The method of claim 15, wherein each of said cuts has a length of between 1 and 5 times the distance separating the cuts.

18. The method of claim 1, wherein said comparing step further includes the steps of (g) proposing a series of values for elements of a stiffness tensor and the residual stress;

(h) calculating frequencies or phase velocities based on said proposed stiffness tensor elements and the residual stress;

(i) comparing the calculated frequencies or phase velocities to said measured frequencies or phase velocities;

(j) repeating steps (g), (h), and (i) and updating the values for elements of the stiffness tensor and the residual stress until said calculated frequencies or phase velocities substantially match said measured frequencies or phase velocities to a desired degree; and (k) determining the residual stress properties from said match between said measured and calculated frequencies or phase velocities.

19. The method of claim 18, wherein said comparing is stopped when the degree of matching is optimized according to a predetermined level.

20. A method for determining the residual stress in a region of an unsupported a first thin film, said method comprising the steps of:

(a) optically exciting the region with a spatially and temporally varying optical excitation field having at least one excitation wavevector, thereby exciting a portion of the region along at least one wavevector;

(b) diffracting a portion of an optical probe field off the excited portion to generate a time-dependent signal field at the excitation wavevector;

(c) detecting the signal field to generate a time-dependent, light-induced signal;

(d) analyzing the light-induced signal to determine its time or frequency-dependent properties; and (e) comparing the time or frequency-dependent properties of the light induced signal to the time or frequency-dependent properties of a second unsupported thin film having known residual stress properties, said comparing allowing the residual stress properties of the first unsupported thin film in the excited region to be determined.

21. A method for determining the residual stress in a region of an unsupported thin film sample, said method comprising the steps of:

(a) optically exciting an unsupported region of the sample in the very thin film regime with a spatially and temporally varying optical excitation field having at least one excitation wavevector, said excitation field being strongly absorbed by the sample and, following absorption, launching a lowest-order acoustic mode along at least one excitation wavevector in the unsupported region;

(b) diffracting a portion of an optical probe field off the excited lowest-order acoustic mode to generate a time-dependent signal field at the excitation wavevector;

(c) detecting the signal field to generate a time-dependent, light-induced signal;

(d) analyzing the light-induced signal to determine the phase velocity of the lowest-order acoustic mode corresponding to at the excitation wavevector; and, (f) comparing the determined phase velocity to that calculated from a mathematical model generated using equations of motions for a stressed unsupported film system in the very thin film regime, said comparing allowing the residual stress properties of the film in the excited region to be determined.

22. A method for measuring the effect of residual stress in an unsupported film, comprising:

preparing the film without substantially effecting the film's residual stress such that a region of the film is unsupported;

optically exciting the film in the unsupported region to induce a Lamb mode;

detecting the Lamb mode, and comparing the dispersion or velocity of the detected Lamb mode to the dispersion or velocity determined from a mode of a model system, thereby allowing measurement of the residual stress in the unsupported film.

* * * * *

UNITED STATES PATENT AND TRADEMARK OFFICE
CERTIFICATE OF CORRECTION

PATENT NO. : 5,546,811
DATED : August 20, 1996
INVENTOR(S) : John A. Rogers, et. al.

It is certified that error appears in the above-indentified patent and that said Letters Patent is hereby corrected as shown below:

Col. 16, line 23, please delete "A", and replace with --Λ--.

Signed and Sealed this

Eighteenth Day of November 1997

Attest:

BRUCE LEHMAN

Attesting Officer

Commissioner of Patents and Trademarks